United States Patent [19]
Colgan

[11] Patent Number: 5,510,978
[45] Date of Patent: Apr. 23, 1996

[54] ELECTRONIC APPARATUS FOR IMPLEMENTING COMMUNITY POLICING PROGRAM AND METHOD THEREFOR

[75] Inventor: Patrick G. Colgan, Brooklyn, N.Y.

[73] Assignee: VERA Institute of Justice, New York, N.Y.

[21] Appl. No.: 187,347

[22] Filed: Jan. 26, 1994

[51] Int. Cl.$^6$ .................................................. G06F 17/60
[52] U.S. Cl. .................. 364/401; 364/419.1; 364/409
[58] Field of Search ..................................... 364/401, 402, 364/409, 419.19, 419.20, 419.10, 419.13

[56] References Cited

U.S. PATENT DOCUMENTS

| | | | |
|---|---|---|---|
| 5,153,830 | 10/1992 | Fisher et al. | 364/419.20 |
| 5,166,499 | 11/1992 | Holland et al. | 364/402 |
| 5,257,185 | 10/1993 | Farley et al. | 364/419.19 |
| 5,295,261 | 3/1994 | Simonetti | 364/419.19 |
| 5,303,147 | 4/1994 | Oba et al. | 364/402 |
| 5,309,359 | 5/1994 | Katz et al. | 364/419.19 |
| 5,310,349 | 5/1994 | Daniels et al. | 364/419.20 |

OTHER PUBLICATIONS

"Data Management For Community Policy", J. Austin and M. Hickey, *The Compiler*, Spring 1993.
"Measuring What Matters", G. Kelling, *The City Journal*, Spring 1992.
"Problem–Oriented Policing", H. Goldstein, pp. 36–39, 48–49, 82–101, (1990) New York: McGraw–Hill.
"PCs For PCs", J. Burrows and J. Dumbell, no date unknown.
"High Tech Tools for the War on Crime", T. Newcombe, *Governing*, Aug. 1993.

*Primary Examiner*—Robert A. Weinhardt
*Attorney, Agent, or Firm*—Morgan & Finnegan

[57] ABSTRACT

A system and method for implementing an electronic data entry and processing system useful to influence and advance the practices of community police officers (CPOs) engaged in community policing. The system may be implemented on a standalone personal computer or on a hand-held computer unit, and it may be used in standalone mode or as part of a system. The system includes a variety of tools, enacted from a main menu screen, that are utilized by the CPO in implementing the community policing philosophy. Each of the tools are logically grouped according to a function practiced by the CPO, such as documentation; investigation; resources; or miscellaneous use. The tools are cross-linked with one another at various points to logically interrelate the tools as they would be used by the CPO in practice.

13 Claims, 48 Drawing Sheets

Beat Overview

| All Supervisor Comments | < Beat > 02 | From: 11/01/93<br>To: 11/20/93 |

All Supervisor Comments for Beat 02

| Supervisor Comments from Work Plans | |
|---|---|
| CAPT<br>METZ<br>11/19/93 | Work Plan for 11/01/93<br>Continue working with Don Parnell, people against prostitution. Utilize car checks and summons. |

| Supervisor Comments from Condition Logs | |
|---|---|
| SGT<br>CARTER<br>11/07/93 | Condition: Prostitution 58-61 St. 3 Ave<br>▷▷▷ Supervisor Comment ◁◁◁<br>Sgt. Carey inspected, |
| SGT<br>CARTER<br>11/07/93 | Condition: Robbery 59 St + 4 Ave, subway<br>▷▷▷ Supervisor Comment ◁◁◁<br>Sgt. Carter inspected. |
| SGT<br>CARTER<br>11/07/93 | Condition: Tresspassing at 55 112th st<br>▷▷▷ Supervisor Comment ◁◁◁<br>Sgt. Carey inspected |

FIG. 3

November 1993     CPO Monthly Work Plan     LT MICHAEL WALSH

< Edit mode >     < Beat > 02     << Save >>

——— CPO Strategy Assessment ———

Problem Status: [SOMEWHAT BETTER]    Effectiveness: [VERY EFFECTIVE]

Strategy Was: [IMPLEMENTED]    Strategy Status: [CONTINUED]

Comments:
The location of 311 11th st has shown great change and promise to be renovated. The new tenants and the old ones state that since the drug dealers and drug users are gone, they feel better and see the building looking alot better than before.

<< Return >>     < Print > < Preview >

< Supervisor Comments >

FIG. 8

Condition Log —  ⟨ Beat ⟩ 02

| Entire Beat Area | Active |
|---|---|
| Abandoned autos; Entire Beat Area | — Active |
| Drug sales/activity 4th ave 56th–61st | — Active |
| Prostitution 58–61 St. 3 Ave. 1800–0530 | — Active |
| Robbery 55–64 St + 4th Ave. | — Active |
| Robbery 59 St + 4 Ave, subway 0800–2130 | — Active |
| Tresspassing at 364 58th st 2400hrs | — Active |
| drug sales/activity 60 st 4th–5th ave | — Active 82 |
| Domestic Violence | — Monitored |
| Drug sales 56th st + 4th ave | — Monitored |
| Drug sales, c/o 58 St + 3 Ave | — Monitored |
| Drug sales – f/o 5814 4th ave | — Monitored |
| Grocery Store 5918 5 Ave | — Monitored |
| Misc. inc. PS 314 attn./after school pro | — Monitored |
| Social Club 371 59 St. | — Monitored |
| burglaries 57–59 St, 4 Ave 0800–2100hrs | — Monitored |

⟨ Supervisor Comment ⟩
⟨ t Comment or Entry ⟩
⟨ fine New Condition ⟩

⟨ roblem Analysis ⟩
⟨ Review Goals ⟩ last 30 Days
int ⟩ ⟨ Preview ⟩

Include Monitored
Include Corrected

⟨ Close ⟩

FIG. 9

| Tresspassing at 55 112th st 2400hrs | - Active | < Beat > 02 |

PO SMITH 11/12/93
11-10-93 vertical 364 58 st shows mailboxes installed and being used by Postal Service. Key for the front door is in newly installed Federal Box in lobby. Met w/ the super Adrian White and he sts that things are going as planned for building reconstruction.

PO SMITH 11/10/93
11/10/93 0900 hours vertical 364 58 st shows new mailboxes in building. Mail Man to be given new key for the front lobby door as soon as possible. Vacant apartments are coming up to speed and should be ready to rent in one to two months.

< Add Supervisor Comment >
< Edit Comment or Entry >
< Define New Condition >
< Problem Analysis >
< Review Goals >

——— Last 30 Days ———
< Print > < Preview >

[X] Include Monitored
[ ] Include Corrected

< Close >

— Tresspassing at 364 58th st 2400hrs — Active —
Make changes to entry, then Tab to the << Save >> or < Cancel > button
Date: 11/12/93

11/10/93 vertical 364 58 st show mailboxes installed and being used by Postal Service. Key for the front door is in newly installed Federal Box in lobby. Met w/ the super Adrian White and he sts that things are going as planned for building recontruction.

PO Ciccone sou

<< Save >>   < Cancel >   < Delete >

FIG. 12

Search Results

LT MICHAEL WALSH

111 — Search for Keyword DRUG
116 — resulted in 247 matching records
    37 — Beat: 01
    Date: 01/05/93
113 — Entry Type Conditions Log Entry 117a Drugs 56 st & 2nd—M.L.K. PARK 24HRS/7 DAYS
12/3/92–12/4/92 Observed loitering, possible drugs at park < Martin Luther > 56 St & 2nd Ave. 7/16/92: 2 arrests.
— 117b

117

115 — Author: CIV RAI

118

< Top >
< Prior >
< Next >
< Bottom >
< Delete >
< Close >
< List >
< Print >
<Preview>

FIG. 17

```
┌─────────────────────────────────────────────────────┐
│ ──────────── Search Results ──────────── LT MICHAEL WALSH │
│                                                             │
│  Search for Keyword DRUG                                    │
│  resulted in 247 matching records                           │
│  Entry Type          Date: 01/05/93    Beat: 01             │
│  Conditions Log Entry                                       │
│  ─────────────────────────────────────────                  │
│  Drugs 56 st & 2nd-M.L.K.PARK 24HRS/7DAYS      < Top >     │
│                                                 < Prior >   │
│  12/3/92-12/4/9 ┌─── Printer Setup ───┐         < Next >   │
│  drugs at park <│ Select printer      │< Ok >   < Bottom > │
│  7/16/92: 2 arr │ ┌─────────┐         │< Cancel>           │
│                 │ │HP4<600dpi│         │         < Delete > │
│                 └─┴─────────┴─────────┘         < Close >  │
│                  < > Normal <o> Compress                    │
│                           119       120         < List >   │
│                                                 < Print >  │
│                                                <Preview>   │
│  Author: CIV RAI                                            │
└─────────────────────────────────────────────────────────────┘
```

FIG. 18

LT MICHAEL WALSH
List of calls by Beat or by Sector

| Address | | # Calls |
|---|---|---|
| ▷330 | 59 STREET | 5 |
| 430 | 61 STREET | 5 |
| 5509 | 4 AVENUE | 4 |
| 475 | 60 STREET | 4 |
| 5905 | 4 AVENUE | 4 |
| 364 | 58 STREET | 3 |
| 459 | 59 STREET | 3 |
| 5824 | 4 AVENUE | 3 |
| 5704 | 5 AVENUE | 2 |
| 6016 | 5 AVENUE | 2 |
| 6024 | 5 AVENUE | 2 |
| 352 | 56 STREET | 2 |
| 376 | 60 STREET | 2 |
| 468 | 60 STREET | 2 |

37   < Beat > 02
     < Time >
     0000 − 2400

< 1 month >
From: 11/01/93
To:   11/19/93

< > All
<o> Top 10

< Update >

< Close >

<o> By # Calls    <o> Inside    <o> By Beat
< > By Location    < > Outside    < > By Sector

FIG. 20

LT MICHAEL WALSH

Calls: 5    0000-2400Hrs.    From:11/01/93    To:11/19/93    Beat: 02
Address: 330    Street1: 59 STREET                                    37
Inside          Street2: 3 AVENUE

| Date | Time | Code | Jobqual | D1 | SEIZURES | Disp | Comments |
|---|---|---|---|---|---|---|---|
| 11/01/93 | 1555 | Ambulance | | | | 90Y | UNNECESARY |
| 11/09/93 | 1325 | Alarm of Fire | C | SCHOOL | | 95 | |
| 11/10/93 | 0052 | Disorderly | P2 | SHOOTING UP | | 91 | |
| 11/12/93 | 1409 | See Complaint | Q1 | SERVE | | 90Y | UNNECESARY |
| 11/13/93 | 1324 | Possible Crime | Y3 | | | 91 | |

< Make Condition Log Entry >    < Print >    < Preview >    < Return >

List of calls by Beat or by Sector                LT MICHAEL WALSH

| Address |  | # Calls |
|---|---|---|
| ▷330 | 59 STREET | 5 |
| 430 | 61 STREET | 5 |
| 5509 | 4 AVENUE | 4 |
| 475 | 60 STREET | 4 |
| 5905 | 4 AVENUE | 3 |
| 364 | 58 STREET | 3 |
| 459 | 59 STREET | 3 |
| 5824 | 4 AVENUE | 2 |
| 5704 | 5 AVENUE | 2 |
| 6016 | 5 AVENUE | 2 |
| 6024 | 5 AVENUE | 2 |
| 352 | 56 STREET | 2 |
| 376 | 60 STREET | 2 |
| 468 | 60 STREET | 2 |

< Beat > 02

< Time >
0000 – 2400

< 1 month >
From: 11/01/93
To:   11/19/93

<o> All
< > Top 10

< Update >

< Close >

Select sector

[ A ]   141

<Cancel>   <<Ok>>  142

<o> By # Calls         <o> Inside    < > By Beat
< > By Location        < > Outside   <o> By Sector 140           132

List of calls by Beat or by Sector

LT MICHAEL WALSH

<Sector> A  
142  
< Time >  
0000 – 2400

< 1 month >  
From: 11/01/93  
To:   11/19/93

<o> All  
< > Top 10

< Update >

< Close >

| Address | | # Calls |
|---|---|---|
| 403 | 17 STREET | 5 |
| 829 | GREENWOOD AVENUE | 5 |
| 1615 | 8 AVENUE | 4 |
| 100 | OCEAN PARKWAY | 4 |
| 447 | 7 AVENUE | 4 |
| 2917 | FT HAMILTN PKWY | 3 |
| 800 | GREENWOOD AVENUE | 3 |
| 50 | OCEAN PARKWAY | 3 |
| 271 | PROSPECT PARK WEST | 3 |
| 66 | WINDSOR PLACE | 3 |
| 313 | 16 STREET | 2 |
| 339 | 16 STREET | 2 |
| 411 | 17 STREET | 2 |
| 453 | 17 STREET | 2 |

<o> By # Calls    <o> Inside    < > By Beat  
< > By Location  < > Outside   <o> By Sector

```
                                                          LT MICHAEL WALSH
  ═══════════ UF 61 Analysis ═══════════              Beat: [02]
                                                           └37
  Select Type of Investigation:
  <○> All Crimes          < > GLA's Only
  < > Robberies Only      < > Other Crimes Only
  < > Burglaries Only     < > Specific PL Section  [       ]
       └156
  Data available from:  01/01/93  up to:  11/16/93
       └126
  Select Dates for investigation:   < 1 month >
       └127                       11/01/93 and 11/16/93 ──128
                        Narrow your search < optional > >>

<By Location >          ┌─────────────────────────────────────┐
  <By Time>               │ Addr: [      ] Street1: [         ] │
  <By Type of Victim>     │ Time between: 0000  and  2400       │
  <By Type of Perp>       │ Race: [  ]  Sex: [ ]  Age: [  ]     │
  <By Type of Auto>       │ Race: [  ]  Sex: [ ]  Age: [  ]     │
  <By Type of Weapon>     │ Make: [  ]  Model: [ ]  LicNo: [  ] Color: [ ] │
  <By Type of Property>   │ Type: [  ]  Cal.: [ ]               │
       └157               │ Type: [  ]  Prop. was: [  ]         │
                          └─────────────────────────────────────┘
                              158─┘
  <Reset All Choices>    <Close>    << Run Investigation ! >>
   └155                                              └159
```

FIG. 25

UF 61 Analysis — LT MICHAEL WALSH

Select Type of Investigation:           Beat: 02
<o> All Crimes      < > GLA's Only
< > Robberies Only  < > Other Crimes Only
< > Burglaries Only < > Specific PL Section [    ]

Data availabl[

Select Dates

Address:              <–Optional

Street: 34 Str

< Cancel >          << Ok >>

<By Location >     Race:[ ]  Sex:[ ]  Age:[ ]
<By Time>          Make:[ ] Model:[ ] LicNo:[ ] Color:[ ]
<By Type of Vi     Type:[ ]
<By Type of Perp>  Type:[ ]  Cal.:[ ]
<By Type of Auto>              Prop. was:[ ]
<By Type of Weapon>
<By Type of Property>

<Reset All Choices>   <Close>   << Run Investigation ! >>

FIG. 26

UF 61 Analysis — LT MICHAEL WALSH

Beat: 02

Select Type of Investigation:
<o> All Crimes     < > GLA's Only
< > Robberies Only < > Other Crimes Only
< > Burglaries Only < > Specific PL Section [           ]

Data available from: 0

Select Dates for inve

Race: [Black]    Sex: [Female]
Age: [ ]
<<Ok>>
<Cancel>

<By Location>          Race: [ ]              Age: [ ]
<By Time>              Make: [ ] Model: [ ]   Age: [ ]
<By Type of Victim>    Sex: [ ]   LicNo: [ ]  Color: [ ]
<By Type of Perp>      Cal.: [ ]
<By Type of Auto>      Type: [ ]
<By Type of Weapon>    Type: [ ]  Prop. was: [ ]
<By Type of Property>

<Reset All Choices>   <Close>   << Run Investigation ! >>

FIG. 27

LT MICHAEL WALSH

UF 61 Analysis

Select Type of Investigation:
<o> All Crimes    < > GLA's Only
< > Robberies Only    < > Other Crimes Only
< > Burglaries Only    < > Specific PL Section [   ]

Beat: [02]

Data a

Select

Setup for "Auto"

Make [MAZD]   Color [BLU]   Model: [ ]   Year: [ ]

< Cancel >    < Return >

<By Loca    Race: [ ]   Sex: [ ]   Age: [ ]
<By Time
<By Type    Make: [ ]   Model: [ ]   LicNo: [ ]   Color: [ ]
<By Type of Perp>
<By Type of Auto>    Type: [ ]   Cal.: [ ]
<By Type of Weapon>
<By Type of Property>    Type: [ ]   Prop. was: [ ]

<Reset All Choices>    <Close>    << Run Investigation ! >>

FIG. 28

===== UF 61 Analysis =====  LT MICHAEL WALSH

Select Type of Investigation:                                Beat: [02]
<o> All Crimes        < > GLA's Only
< > Robberies Only    < > Other Crimes Only
< > Burglaries Only   < > Specific PL Section [        ]

Data avail
Select Dat ┌──────── Property ────────┐
           │ Property Type:  Property Was:
           │ ┌────────┐
           │ │Personal│   < > Stolen  < > Lost
           │ └────────┘
           │          <Cancel>      <<Return>>
           └──────────────────────────┘

<By Location>    Race:[    ]  Sex:[  ]  Age:[  ]
<By Time>        Race:[    ]  Sex:[  ]  Age:[  ]
<By Type of Victim>   Make:[    ] Model:[    ] LicNo:[    ] Color:[ ]
<By Type of Perp>     Type:[    ] Cal.:[    ]
<By Type of Auto>     Type:[    ] Prop. was:[    ]
<By Type of Weapon>
<By Type of Property>

<Reset All Choices>    <Close>    << Run Investigation ! >>

FIG. 29

===== UF 61 Analysis =====                                LT MICHAEL WALSH

Select Type of Investigation:                             Beat: [02]
 <o> All Crimes        < > GLA's Only
 < > Robberies Only    < > Other Crimes Only
 < > Burglaries Only   < > Specific PL Section [    ]

Press < Enter > to select.
Data available from:                          ┐
Select Dates for inv    ┌──────────────────┐  │
                        │   6 month        │──┼── 127
                        │   1 month        │  │
                        │   1 week         │  │
                        │   Other          │  │
                        │                  │  │
                 128 ── │ From: 11/01/93   │  │
                        │ To:   11/16/93   │  │
                        │                  │  │
                        │ < Cancel >  << Ok >>│
                        └──────────────────┘

<By Location >                                    Age: [ ]
<By Time>                                         Age: [ ]
<By Type of Victim>     Type:  [ ]   Cal.:  [ ]   Color: [ ]
<By Type of Perp>       Type:  [ ]   Prop. was: [ ]
<By Type of Auto>
<By Type of Weapon>
<By Type of Property>

<Reset All Choices>   <Close>    << Run Investigation ! >>

FIG. 30

LT MICHAEL WALSH

——— UF61 investigation. ———
Type of investigation: All Crimes   Beat: 02
Select from uf61's for review or printing. Press enter for select. '37

| Description | Date | Time | Comp# | PT | Address |
|---|---|---|---|---|---|
| CRIM MISCHIEF 4TH | 11/16/93 | 1855 | 12070 | 1 | 260 52ND STREET |
| CRIM POSS WEAPON 4TH | 11/16/93 | 1835 | 12072 | 1 | 5801 04TH AVENU |
| ROBBERY 3RD | 11/14/93 | 2030 | 12005 | 2 | 04TH AVENU |
| ROBBERY 2 INJ OTHER | 11/14/93 | 2005 | 11998 | 2 | 63RD STREET |
| ASSAULT 2ND | 11/13/93 | 1800 | 12066 | 1 | 420 64TH STREET |
| MV LEAV/SCEN PROP/DA | 11/13/93 | 2100 | 11963 | 0 | 413 63RD ST |
| LOST PROP MV PLATE | 11/13/93 | 2100 | 11950 | 0 | 60TH STREET |
| HARASSMENT | 11/12/93 | 2340 | 11929 | 1 | 434 58TH STREET |
| ROBBERY 2ND AIDED + | 11/12/93 | 1100 | 12048 | 2 | 59TH ST |
| CRIM TAMP 2ND | 11/11/93 | 1533 | 12046 | 0 | 59TH ST |
| AGGRAV HARASS 2ND | 11/11/93 | 1800 | 11893 | 1 | 465 55TH STREET |

<Print selected UF61's>  <Select All>   <<  Go  >>
<Make CondLog Entry>    <Deselect>

FIG. 31

―――――――――――― UF61 investigation. ――――――――――――  LT MICHAEL WALSH

Type of investigation: All Crimes                                Beat: 02
Select from uf61's for review or printing. Press enter for select.

| Description | Date | Time | Comp# | PT | Address |
|---|---|---|---|---|---|
| ✓ CRIM MISCHIEF 4TH | 11/16/93 | 1855 | 12070 | 1 | 260 52ND STREET |
| ✓ CRIM POSS WEAPON 4TH | 11/16/93 | 1835 | 12072 | 1 | 5801 04TH AVENU |
| ROBBERY 3RD | 11/14/93 | 2030 | 12005 | 2 | 04TH AVENU |
| ROBBERY 2 INJ OTHER | 11/14/93 | 2005 | 11998 | 2 | 63RD STREET |
| ASSAULT 2ND | 11/13/93 | 1800 | 12066 | 1 | 420 64TH STREET |
| MV LEAV/SCEN PROP/DA | 11/13/93 | 2100 | 11963 | 0 | 413 63RD ST |
| LOST PROP MV PLATE | 11/13/93 | 2100 | 11950 | 0 | 60TH STREET |
| HARASSMENT | 11/12/93 | 2340 | 11929 | 1 | 434 58TH STREET |
| ROBBERY 2ND AIDED | 11/12/93 | 1100 | 12048 | 2 | 59TH ST |
| CRIM TAMP 2ND | 11/11/93 | 1533 | 12046 | 0 | 59TH ST |
| AGGRAV HARASS 2ND | 11/11/93 | 1800 | 11893 | 1 | 465 55TH STREET |

<Print selected UF61's>   <Select All>     << Go >>

<Make CondLog Entry>     <Deselect>                      <Return>

```
┌─────────────────────────── Complaint record ───────────────────────────┐
│                                                             Rec. 1 of 1 │
│ Beat:  02    Crime: CRIM MISCHIEF 4TH                                   │
│ Compl.No.:12070  Report date:11/16/93  Report time:1905Hrs.             │
│ Place of occur:  2 GROVE STREET         Date:11/16/93 Time:18:55        │
│ ┌─Comments:──────────────────────┐                                      │
│ │ CAR ANTENNA BROKEN             │                                      │
│ │                                │                                      │
│ └────────────────────────────────┘                                      │
│ ┌─Victim─────────────────────────────────┐   Race:  White               │
│ │ Name:    WILLIAMS HOWARD T             │   Sex:   Male                │
│ │ Address:   3 DOUGLAS ST    State:NY  Zip:│ Age:   27                  │
│ │ City:    BKLYN                          │                             │
│ │ Home phones#:  (718)555-555  Work phone#:  N/A │                      │
│ └────────────────────────────────────────┘                              │
│                                                                         │
│ No of Perps:  1  Wanted: 0  Arrested: 1  Weapon: Y  Gun type:  Gun col: │
│ ┌─Perp.1:──────────────────────┬─Perp.2:──────────────┐                 │
│ │ Sex:Male  Age:31  Hgt:587    │ Sex:Unknown  Age:0  Hgt:│  <Previous> │
│ │ Race:Hisp./White  Wgt:160    │ Race:Unknown      Wgt:  │  < Next >   │
│ └──────────────────────────────┴──────────────────────┘  ┌───────────┐ │
│                                              < Preview > │ < Return >│ │
│                                                          └───────────┘ │
└─────────────────────────────────────────────────────────────────────────┘
       163                                                          161a
```

FIG. 33

―― Document search results in Condition Log ――
Select condition related to search results

| Abandoned autos/Rotow: | Entire Beat Area – Active |

Summarize search results here

CRIM MISCHIEF 4TH      21207   11/16/93   1855hrs.
CRIM POSS WEAPON 4TH   21207   11/16/93   1835hrs.
ROBBERY 2ND AIDED +    21204   11/12/93   1100hrs.

LT MICHAEL WALSH

Beat: 02

<< Save >>

< Cancel >

FIG. 34

Phone Book

Type letter to move. 37

| Name | C | Beat |
|---|---|---|
| HARPO, | N | 08 |
| HARRIGAN,B | N | 05 |
| HARRIS,AZAR | N | 13 |
| HAXSTER,S | N | 03 |
| HENNIMAN,ANASTACIA | N | 04 |
| HERNANDEZ,N | N | 04 |
| HIGHSTREET,N | N | 08 |
| HIRK,J | N | 13 |
| HISTI,I | N | 04 |
| HO,N | N | 02 |
| HO,A | N | 06 |
| HOOPER,A | N | 13 |
| HOOVER,H | N | 04 |
| HORAN,G | N | 01 |
| HUBBLE,C | N | 07 |
| HUD,M | N | 02 |
| HUDSON,A | N | 13 |

< > Contact

Name: HISTI

Phone: (718) 555-2032
Category: People

Address: 5555
5TH AVE
BROOKLYN        NY 11220

Comments

Press < Esc > to Return, < Enter > for Copy.

FIG. 35

EL WALSH

Choose report to print or view:

All Supervisor Comments
Block Profile – Address Order
Block Profile – Name Order
Cond Log Memo Book Size – Compress Only
Condition Log
Condition/Problem Index
Condition/Problem Index – New
Monthly Work Plan – By Beat, Month
Organization Review – Recently Updated
People Review – Recently Updated Records
Review Monthly Work Plan w/Condition Log HP4<  600dpi  >11F1

<o> Normal  < > Compress

<o> To Screen    << OK >>
< > To Print      < Cancel >

―― Social Service Data Entry Window ――　LT MICHAEL VALSH

Name: ADULT CHILDREN OF ALCOHOLICS GRACE CHURCH
Address:
Rm.#:
Phone: (718)624-1850
< Category >:  | Adult Services |
                | Alcohol Services |

< Description >
ACOA - Adult Children of Alcoholics Grace Church00   △ CIV
Colgan 12/04/92

Order by:Name          < Print >

<<Save >>
<Cancel >
∨ Add ∧
∨ Edit ∧
∨ Find ∧
∨ List ∧
< Order ∧
∨ Close ∧
∨ Top ∧
<Bottom>
< Prior ∧
< Next ∧
< Delete ∧

FIG. 38

```
<<Save>>
<<Cancel>
 < Add >
 < Edit >
 < Find >
 < List >
 < Order >
 < Close >
 < Top >
 <Bottom>
 < Prior >
 < Next >
 < Delete >
```

—— User Maintenance ——

First Name          Last Name
JOHN                SMITH

Rank [PO]   Tax # 333333   Shield 4444444   Assignment [PATROL]

< Beat >

Password:

Entered:        Updated:        Author:
01/12/94          / /           555555

Condition Overview — Beat Overview

< Beat > 02    From: 11/01/93
              To:   11/20/93

| Title | Condition Logs | Work Plans | Most Recent Plan ? | When ID'd | Status |
|---|---|---|---|---|---|
| Tresspassing at 55 112th st 2400hrs | 4 | 19 | Nov 93 | Aug 92 | Active |
| Robbery 59 St + 4 Ave, subway | 2 | 8 | Nov 93 | Jan 93 | Active |
| Abandoned autos/Rotow: Entire Beat | 1 | 12 | Jan 93 | Aug 92 | Active |
| Domestic Violence | 1 | 0 | Never | May 93 | Monito |
| Prostitution 58–61 St. | 1 | 12 | Nov 93 | Jan 93 | Active |
| Burglary 61 to 64 St. | 0 | 1 | Sep 92 | Jan 93 | Correc |
| Disorderly groups, 4th Ave. 57–60 St. | 0 | 8 | Jan 93 | Jan 93 | Correc |
| Double parking 4th ave + 59th – 60th st | 0 | 8 | Sep 92 | Aug 92 | Correc |
| Double parking 5th Ave. | 0 | 2 | Jan 93 | Jan 93 | Correc |
| Drug sales 56th st + 4th Ave. | 0 | 0 | Never | Aug 92 | Monito |
| Drug sales 5915 4th Ave. | 0 | 2 | Oct 91 | Jan 93 | Correc |
| Drug sales f/o bodega 57th st + 4th ave | 0 | 0 | Never | Aug 92 | Correc |
| Drug sales, c/o 58 St + 3 Ave. | 0 | 4 | Nov 91 | Jan 93 | Monito |

FIG. 42A

| Description | | | | | |
|---|---|---|---|---|---|
| Drug sales - f/o 5814 4th ave | 0 | 2 | Apr 92 | Aug 92 | Monito |
| Drug sales/activity 4th ave 56th - 61st | 0 | 9 | Jun 92 | Aug 92 | Active |
| Grocery Store 5918 5 ave | 0 | 0 | Never | Aug 93 | Monito |
| Loud music 480 59th St. | 0 | 1 | Mar 92 | Jan 93 | Correc |
| Loud music, 56 St + 3&4 Aves. | 0 | 1 | May 92 | Jan 93 | Correc |
| Misc. inc. PS 314 attn./after school | 0 | 0 | Never | May 93 | Monito |
| Numerous radio runs, 5915 4th Ave. | 0 | 2 | Aug 91 | Jan 93 | Correc |
| People in PS314 schoolyard | 0 | 1 | Jun 92 | Jan 93 | Correc |
| Robberies throughout Beat | 0 | 1 | Mar 93 | Mar 93 | Correc |
| Robbery 55-64 St + 4th Ave. | 0 | 2 | Nov 92 | Jan 93 | Active |
| Robbery/drugs 59th st + 5th ave | 0 | 1 | Oct 91 | Aug 92 | Correc |
| Social Club 371 59 St. | 0 | 2 | Oct 91 | Jan 93 | Monito |
| Special attn to play street 61 + 4,5 | 0 | 3 | Aug 92 | Jan 93 | Correc |
| Burglaries 57-59 St, 4 Ave | 0 | 2 | Jan 93 | Jan 93 | Monito |
| Drug sales/activity 60 st 4th-5th ave | 0 | 11 | Nov 92 | Aug 92 | Active |
| Total: | 9 | | | | <99 |
| | 401 | 402 | 403 | 404 | |

< Overall Beat Comment >    < Reports >    < Close >

FIG. 42B

ELECTRONIC APPARATUS FOR IMPLEMENTING COMMUNITY POLICING PROGRAM AND METHOD THEREFOR

FIELD OF THE INVENTION

This invention relates to an electronic data entry and processing system especially useful in community policing efforts. In particular, a system and method for community policing, used by police officers, provides a framework for information-gathering and problem-solving tasks in the field.

BACKGROUND OF THE INVENTION

Prior to the advent of community policing in the mid-1980's, the conventional method for policing urban America was through random patrol. Police officers using patrol cars outfitted with land-mobile radio systems would randomly police often unfamiliar neighborhoods. These mobile patrols responded to an endless string of radio calls from the 911 operator which permitted them to rapidly arrive at crime scenes, though usually after the suspects had fled. Such a philosophy of reactive random patrol did not generally allow for individual officers to become familiar with and responsible for specific community problems.

In 1984, the Vera Institute of Justice developed the Community Patrol Officer Program (CPOP) which was implemented by the New-York City Police Department over the next four years. Thus, New York City became the first large-scale application of the "community policing" philosophy in the United States. Part of the goal of community policing is to put community patrol officers (CPOs) back on foot patrol to an assigned "beat". The overall goal of these efforts is to put the CPO in touch with the neighborhoods that they are responsible for protecting. The CPO must identify problems within his community and then work with the community, utilizing various resources, to try and solve those problems.

To better grasp the concept of community policing, FIG. 4a illustrates in flowchart form various "elements" 10a–10g underlying that philosophy, together with the interrelationship of those elements as part of the concept. At least seven basic elements underlie the community policing philosophy: communication (10a); supervision (10b); documentation (10c); problem analysis (10f); strategic planning (10e); progress review (10d); and investigation (10g). Underlying all of these elements, of course, is the input communicated between the community 12 and the police officers.

Elements 10a–10g thus represent basic components associated with problem solving in the community and these elements interact with each other during the CPO's efforts. As illustrated in FIG. 4a, the element of communication 10a interacts with input from the community 12 as a gauge of the officer's efforts and progress in addressing community problems, while also relating both to supervisory efforts 10b in guiding the officer and to the documentation 10c of the CPO's communications both with his supervisory authorities 10b and with the community 12, all to enable the officer to organize his planning efforts to address the problem in the community. Similarly, the supervisor 10b can influence the CPO's documentation 10c and communicate 10b with the CPO in an effort to guide the officer. Fundamental to the officer's work is his investigative effort 10g, which will interact with his problem analysis 10f in identifying the problem, which in turn is related to the CPO's documentation efforts 10c or influenced by his supervisor 10b and the communication 10a gleaned from the community 12. In turn, the officers' strategic planning 10e will be influenced in addressing the problem and guide him in the analysis of his progress 10d in solving the problem. The officer's problem analysis 10f influences his strategic planning efforts 10e that in turn is guided by his documentation efforts 10c. Strategic planning 10e interacts with problem analysis 10f and the officer's documentation 10c, while in turn the strategic planning influences the officer's goals and strategies in assessing his progress 10d in solving the problem. Progress review 10d in turn is guided by the documentation process 10c.

As might be imagined from the intricate elemental relationship underlying the philosophy of community policing, an underlying objective in community policing is to give the CPOs the training, resources, and discretionary freedom needed to allow them to become familiar with and creatively address a community's real concerns. This implies a shift away from the traditional command and control view of policing toward a view that allows more room for innovation.

The realization of effective community policing depends upon the development of suitable problem-solving tools that are tailored to the CPO's needs in effectively correlating the elements underlying the philosophy. One prior art technique, developed by the Vera Institute in the mid-1980's, was a loose-leaf notebook known as a "beatbook" that contained a variety of printed forms providing a framework for implementing the elements of community policing. Thus, the loose-leaf notebooks sought to provide a mechanism for documenting the officer's communicative relations with the community 12 and the supervisory authorities 10b, and to otherwise document his information-gathering efforts 10g and his problem-solving efforts 10d–f in the field. The notebooks lead officers through a monthly prioritization of issues/problems encountered on their beats, and implemented a written outline of proposed remedies. In addition, the notebook acted as a resource directory and contained profiles of Community businesses, organizations and city agencies.

While providing an innovative approach, in practice the loose-leaf notebooks have not proven very successful as a problem-solving tool. Owing to its handwritten, notebook-style format, and the fact that there are 16 to 25 separate books for each police precinct, the current notebooks are not well-suited to data entry or to information retrieval, nor are they conducive to meaningful interaction by the officers preparing them, their supervisors, or by other officers concerned with that beat. Officers have found the notebooks difficult to use as investigative tools and in large measure they have been reluctant to document their activities or to cross-reference them. This, in turn, has hindered supervisory efforts to guide the officers in their progress towards solving problems. Thus, the present notebooks have not been used by CPOs as intended to further the goals of community policing.

There exists a need, therefore, for a system of implementing and organizing data, information, and solutions necessary for CPOs in their efforts to implement community policing which is readily compact and adaptable to use by multiple CPOs and supervisors.

The present invention solves the problems inherent in its predecessor and thus allows officers to better identify opportunities to track persistent problems in their communities, to solve problems, to share information with their colleagues and supervisors, and to execute and evaluate a variety of remedial strategies.

SUMMARY OF THE INVENTION

In accordance with the invention, a system and method are provided for community policing. The system and method provide a set of interactive tools which supercede the various paper tools available to the CPO and paper notebooks associated with the current practice in a manner which will be user friendly; which will interrelate the various tools in a logical manner for ease of use and efficiency by practice of the CPO; which will advance the CPO's problem solving efforts in the field; and which will effectively correlate the various elements underlying community policing philosophy.

In one embodiment of the system and method according to the invention, the electronic data entry and processing system for community policing is implemented on either a standalone or handheld digital computer unit. The computer unit includes an input device such as a mouse or touchscreen permitting the user to interact with the various tools and options of the notebook. The system and method may also be implemented as part of a network permitting multiple users to simultaneously interact with the system and to communicate with each other.

The system includes a number of tools, some of which are depictive of various of the forms and notebooks utilized by the CPO in the prior looseleaf notebook format. The tools are broadly grouped according to logical functions representative of the CPO's practice of the community policing philosophy. In order to avoid the problems associated in current practice, the tools are linked with the one another at various points to present the user with a logical and user-efficient approach to community policing.

Each of the tools are contained in one or more "screens" accessed by the user through the input device. The tools feature various option buttons executed by the user which permit the tools to interact with the CPO's thought analysis in addressing problems and conditions on his beat. Examples of the interactive tools include: a workplan; a condition log; a problem definition tool; a meeting report tool; a keyword search tool; a crime report search tool; a resources tool; and a tool to allow the CPO to interact with system programmers and administrators.

BRIEF DESCRIPTION OF THE DRAWINGS

FIG. 3 illustrates a sample screen of supervisor comments as accessed from the screen of FIG. 2;

FIG. 8 depicts a strategy assessment screen utilized with the main monthly workplan screen of FIG. 5;

FIG. 9 depicts a main condition log screen accessed from the main menu screen of FIG. 4;

FIG. 10 depicts a second condition log screen, as accessed from the main condition log screen of FIG. 9, illustrating in greater detail aspects of the conditions listed in the screen of FIG. 9;

Figure 11:
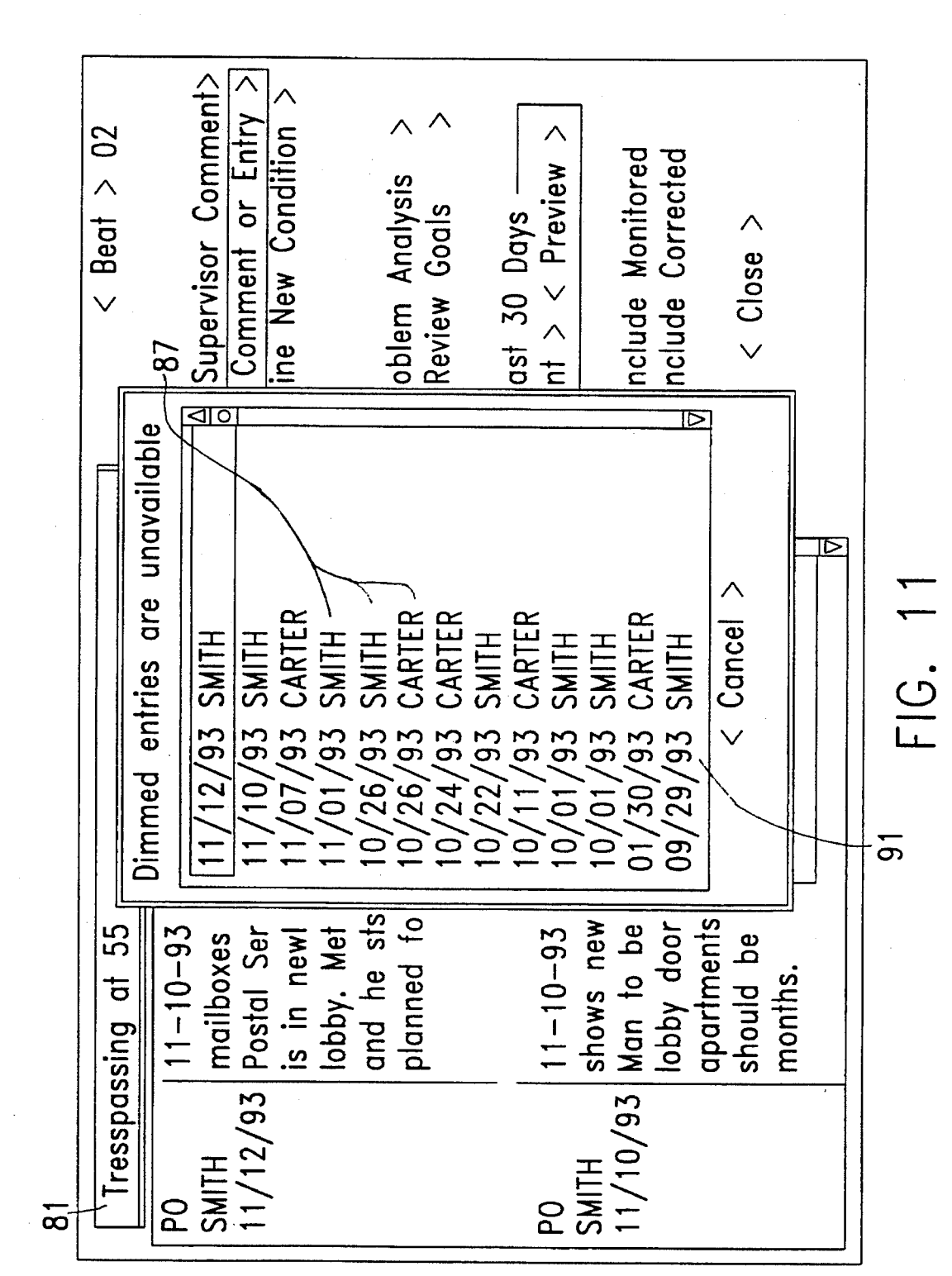

FIG. 11 illustrates a further condition log screen listing in reverse chronological order and by author the conditions found in the screens of FIGS. 9 and 10, as accessed from the screen of FIG. 10;

FIG. 12 depicts a screen for editing a comment or entry relative to a condition listed in the screens of FIGS. 9–11;

FIG. 17 depicts a results screen of a keyword search executed from the screen of FIG. 16;

FIG. 18 depicts a general screen which allows a user to define printer information relative to the user's enaction of a print function in various parts of the system;

FIG. 20 illustrates a results screen of 911 calls of interest for a particular CPO beat, as defined by certain parameters executed by the user in the main screen of FIG. 19;

FIG. 21 illustrates a detail screen of 911 call activity for a given geographic address, as listed in the results screen of FIG. 20;

FIG. 22 depicts a screen for altering the scope of the search from a particular CPO beat to a sector grouping a number of CPO beats;

FIG. 24 illustrates a results screen of 911 call activity for a given sector of beats as redefined by the CPO through the screens of FIGS. 19, 22, 23;

FIG. 25 illustrates a main screen for searching citizen crime report information, as accessed from the main menu screen of FIG. 4;

FIGS. 26–30 variously depict subscreens of FIG. 25 for modifying certain parameters associated with a citizen crime report search, as enacted from the main crime report search screen of FIG. 25;

FIG. 31 depicts a results screen for a crime report search as defined by parameters indicated by the user in FIGS. 25–30;

FIG. 32 illustrates a modification of the screen of FIG. 31 for selecting particular crime reports for further investigation;

FIG. 33 illustrates a sample screen of a typical citizen crime report;

FIG. 34 depicts a generic sample screen utilized in various parts of the beatbook and here illustrating a user making a condition log entry relative to the particular crime reports selected by the user in FIG. 32;

FIG. 35 illustrates a main phone book listing of community resources, as accessed from the main menu screen of FIG. 4;

FIG. 37 depicts a main menu screen utilized to generate various hard copy reports of the information contained within various parts of the system, as enacted from the main menu screen of FIG. 4;

FIG. 38 depicts a main screen of social service contacts in the community, as accessed from the main menu screen of FIG. 4;

FIG. 40 depicts a user maintenance screen utilized by system programmers or administrators, as enacted from the main menu screen of FIG. 4;

FIG. 42 illustrates a beat overview screen, as accessed from the main menu screen of FIG. 4.

DETAILED DESCRIPTION OF THE DRAWINGS

I. Introduction

A brief introduction to certain aspects of the system and method of the invention as set forth in the subsequent discussion will prove of benefit in explaining various of the features and functions associated with the system.

Figure 41:
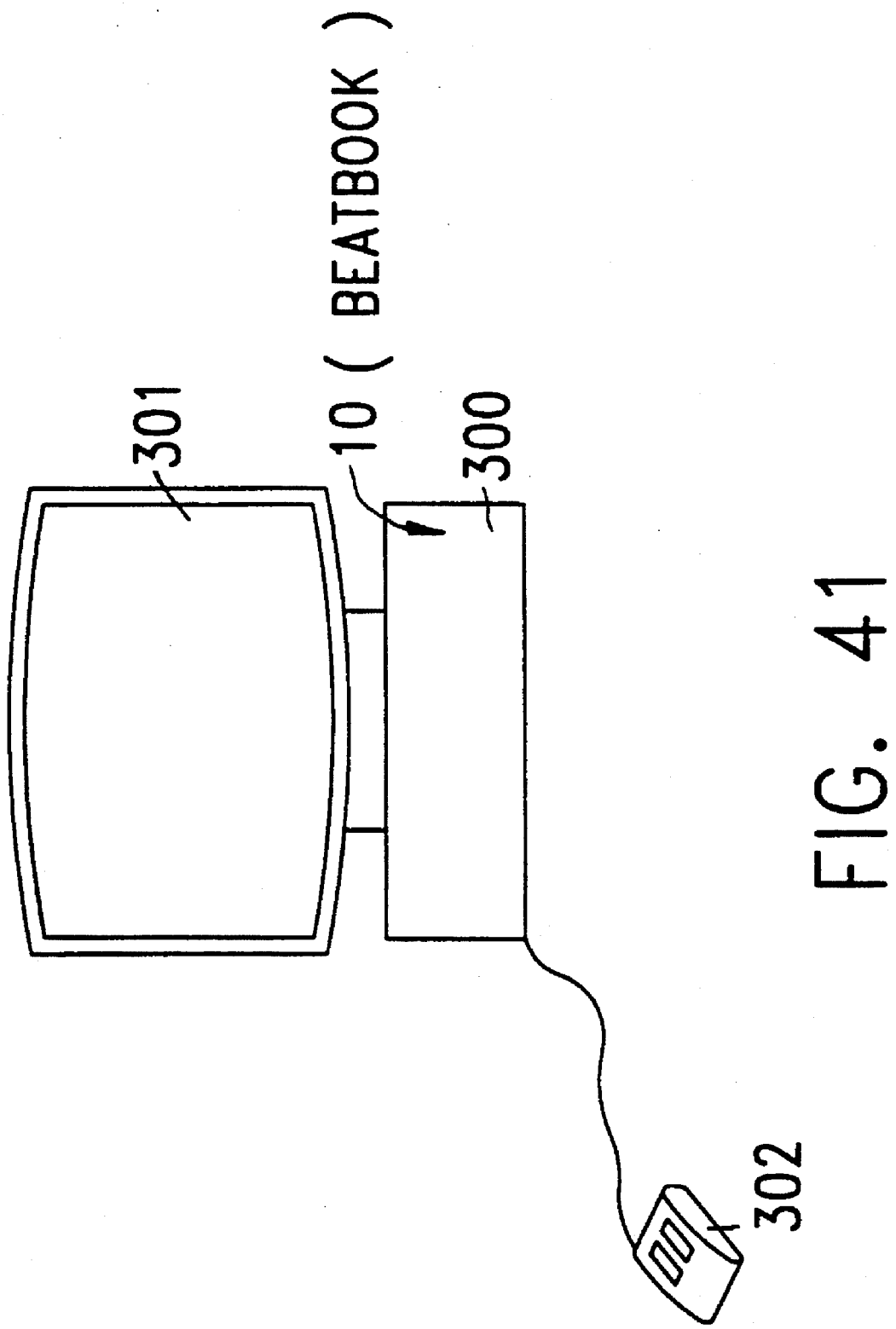
FIG. 41 is a schematic outline of components for implementing the method and system of the invention.

Referring to FIG. 41, the system and method according to the invention may be implemented in software form 10 on a digital computer 300 operating, for example, on DOS Version 3.3 or higher. While the computer 300 may operate on any number of standardized central processing units (CPU's), for maximum operating efficiency the computer 300 will preferably include a CPU operating with speeds and capacities at least at the 286 chip standard. The computer 300 may include, for example, two (2) megabytes of system RAM and about five (5) megabytes of hard drive storage capacity. It will also be evident to those skilled in the art that the system and method may be readily implemented on a variety of the so-called "Personal Digital Assistants" (PDA's), permitting mobile use of the system by the CPO. Examples of such PDA's include the Newton Messagepad manufactured and sold by Apple Computer, Inc. of Cupertino, Calif., and the Hewlett-Packard 95LX or 100LX palmtop computers manufactured and sold by the Hewlett-Packard Company of Palo Alto, Calif. For purpose of illustration and not of limitation, the various aspects of the system and method of the invention, such as the appearance of the various screens, text, graphics, or the like, can be implemented utilizing the FoxPro Versions 2.0 and 2.5 programming languages.

For ease of explanation, the system and method will be described with reference to its use as a standalone unit. However, it will be understood to those skilled in the art that the system and method according to the invention is not so limited and that it may be simultaneously practiced by any number of designated users. For instance, any number of computer units 300 can be linked together in manners known to those skilled in the art to form local area networks (LANs), wireless communication networks, or the like. Both the standalone computer units 300 or the PDA's may interact with the overall network via conventional modems or cellular modem units. Thus, the system and method according to the invention may be accessed from a central server location so as to enable a plurality of users to utilize the system and method simultaneously and to otherwise communicate with each through various parts of the system.

As will be evident from the following description, the system offers the user various "tools". A number of these tools are depictive of the functions previously provided by one or more of the variety of forms previously utilized in the looseleaf notebook format, alone or in combination with one another. A number of these tools represent enhanced functions not possible by the looseleaf format notebooks. Thus, the tools may represent functions of the various notebooks themselves, or they may otherwise be representative of functions not found in the looseleaf format notebook such as a user's use of and correlation of various of the notebooks, forms etc. as practiced by an officer in the field. For purposes of illustration, the tools themselves or subfunctions thereof as to be described herein are typically enacted by using a variety of option "buttons" displayed on numerous of the screens. Oftentimes, the option buttons and/or the screens themselves are representative of the actual tools, and thus those terms may be referred to interchangeably. It will be apparent to those skilled in the art that the buttons can be enacted in various manners, such as by pointing with the well-known "mouse" input device 302 and "clicking" the appropriate button on the screen; by placing the screen prompt over the desired option button through keyboard navigation cursors and pressing the enter key; or by replacing a standard CRT screen with one of the various known touchscreen CRTs 301, such as the Goldstar 1460 Plus 14" SVGA CRT with integrated Touch Frame, available from Carrol Touch in Pound Rock, Tex.

II. Description

Referring now to the drawings, wherein like numerals refer to like components, FIGS. 1–42 depict one embodiment of a system for implementing tools of an electronic data entry and processing system according to the invention. As before described, the system and method according to the invention may be implemented in software form according to the flowcharts and screens driving the system as will be explained herein. FIGS. 1–4d provide a general overview of the mode of operation of the elemental interrelationships underlying community policing together with flowcharts of certain main screens of the system, while FIGS. 5–42 depict various of the screens driving the method and system according to the invention.

Figure 1:
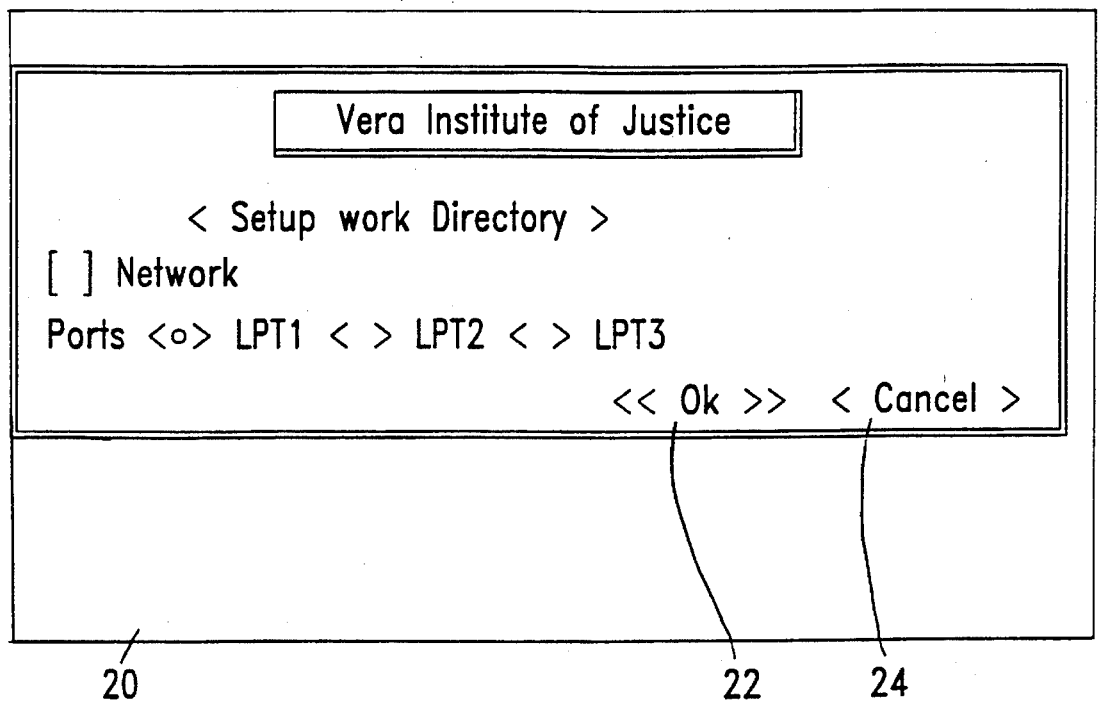
FIG. 1 depicts a log-on screen for the electronic data entry and processing system ("system") according to the invention.

FIG. 1 depicts an entry screen 20 which will appear when the CPO wishes to log on to the system of the electronic beatbook. While not illustrated, the entry screen 20 may include certain prompts requiring user IDs, indication of the user's status (whether the user is a CPO, supervisor, etc.) or the like to permit a user to enter the system. As explained in the Introduction, a button 22 positioned on the screen may be enabled via an electronic mouse 302 connected to the computer 300 or by depressing the CRT area above button 22 on a touch screen 301 (FIG. 41) to enter the system. Similarly, enacting the "cancel" button 24 will allow the officer to cancel his logon request.

Figure 2:
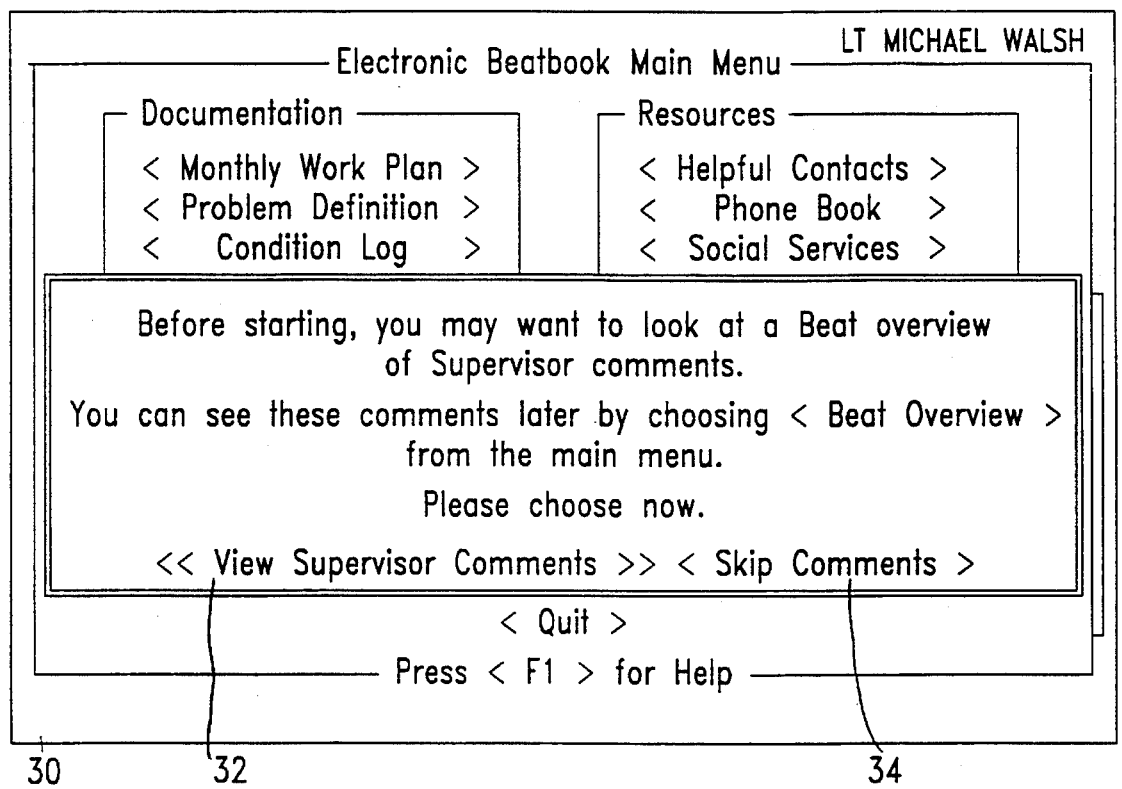
FIG. 2 illustrates a partial main screen permitting the officer to view supervisor comments prior to commencing work on the system.
Figure 4:
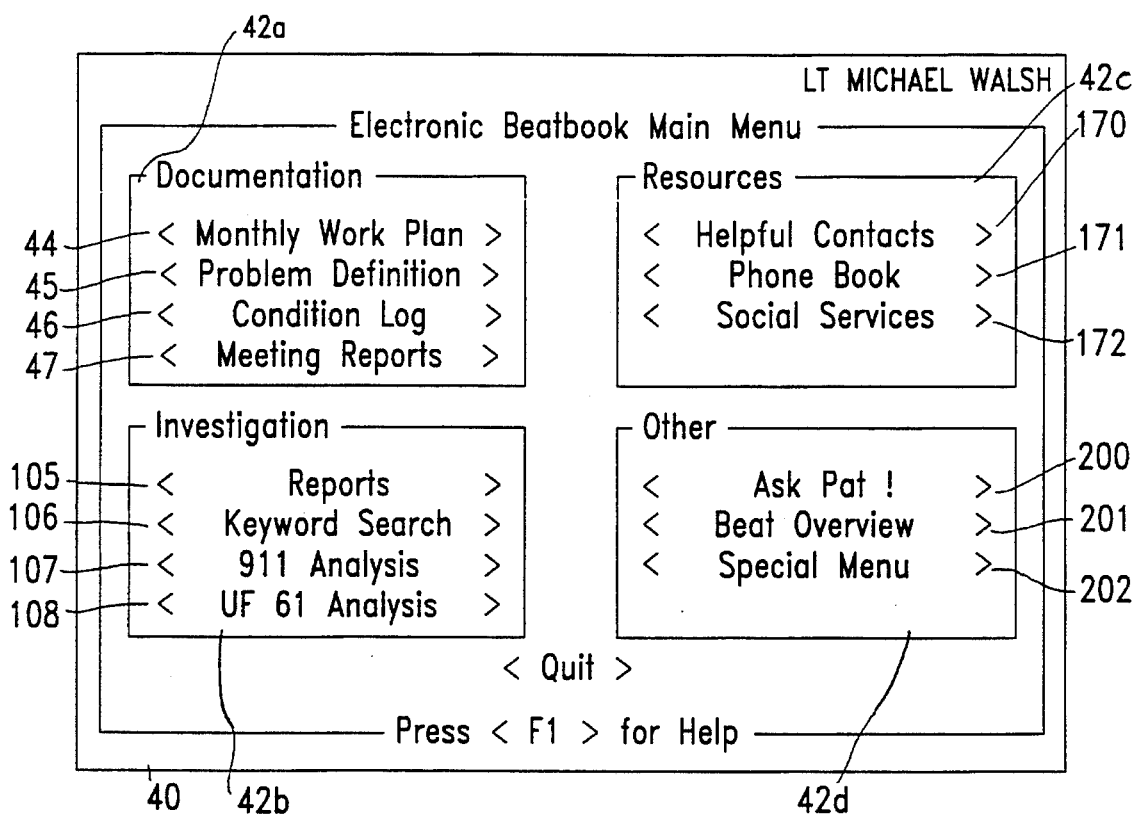
FIG. 4 depicts a main menu screen driving the various tools of the electronic data entry and processing system according to the invention.

FIG. 2 depicts a modification 30 of the main menu screen of FIG. 4 (to be shortly described) which will appear when the CPO depresses button 22 on entry screen 20. Here, the CPO can view any supervisor comments 32 prior to commencing his efforts on the system, or he can choose to skip same (button 34) and go directly to the main menu screen of FIG. 4. It will be readily appreciated that as the system is implemented to advance the practice of community policing, the CPO will be encouraged to interact with any supervisor comments prior to his entry and use of the system as a means of reinforcement. In this light, the system may be configured to require the CPO to view the supervisor comments prior to the entry on the system, or to otherwise require that the CPO actively engage the skip button 34 should he not desire supervisor feedback.

FIG. 3 depicts a supervisor comment screen 36 which will appear either upon the CPO's access from screen 30, or from a beat overview screen 400 accessed through the user's enaction of a beat overview tool 201 on main menu screen of FIG. 4, to be explained in greater detail below. As will be evident on many of the screens to be discussed hereafter, the supervisor comment screen 36 includes a button 37 which identifies a particular officer beat to which the screen relates, together with a temporal outline button 38 which defines the beginning and end dates for all of the information displayed on the screen of interest. Each of the beats 37 or temporal outlines 38 can be changed or modified by the user, as desired, by enacting the button of interest on the screen.

The supervisor comments screen 36 of FIG. 3 gathers on one screen all of the supervisor comments entered in various parts of the system (FIG. 4) by the CPO's supervisors for the beat (37) over the dates (38) of interest. As will be elaborated in the discussion below, the comments screen 36 will contain supervisor comments for various of the CPO's work plan documentation 50, condition log documentation 80, and the like, as a tool to guide the CPO's further efforts on the system.

If the CPO has chosen to skip supervisor comments (FIG. 2; button 34) or has otherwise terminated his review of them (FIG. 3), he will be introduced to the main menu screen 40 (FIG. 4) which serves as the focal point for all of the subsequent screens ("tools") which are utilized by the electronic data entry and processing system according to the invention.

For convenience, the main menu screen 40 is broadly divided in four main areas 42a–42d representative of broad "groups" of tools (screens) arranged according to the CPO's elemental tasks in the community policing philosophy. The main group areas of tools (screens) include: "documentation" (42a), wherein most of the CPO's and supervisor's documentation efforts to implement the elements 10a–10g of community policing are focused; "investigation" (42b), wherein the officer and supervisor are given access to a variety of tools useful in the investigation (10g), strategic planning (10e) and problem analysis elements (10f) of community policing philosophy; a "resources" area (42c) containing tools for locating community and governmental resources useful in implementing strategies and achieving goals according to an officer's investigation (10g), problem analysis (10f) or strategic planning (10e) in community policing, as well as to document the CPO's unique contacts and approaches to utilizing the resources in his practice of community policing; and a miscellaneous "other" area (42d), containing other screens (tools) useful in answering various CPO inquiries and enabling modification of the system as dictated by CPO comments to network administrators or programmers.

Figures 1, 4A:
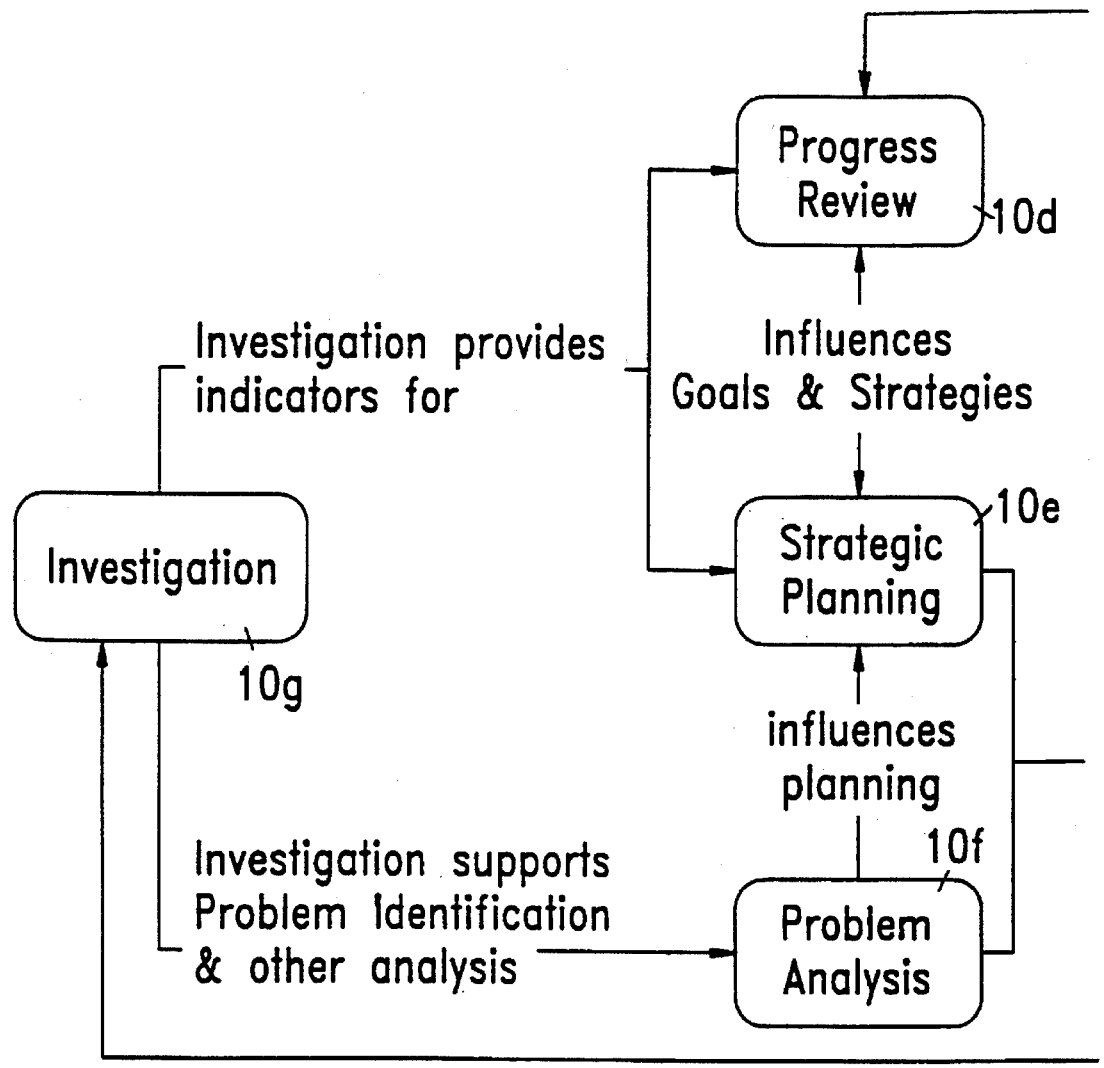
FIG. 4a depicts in flowchart form the various elements and interrelationships underlying the philosophy of community policing.
Figures 2, 4A:
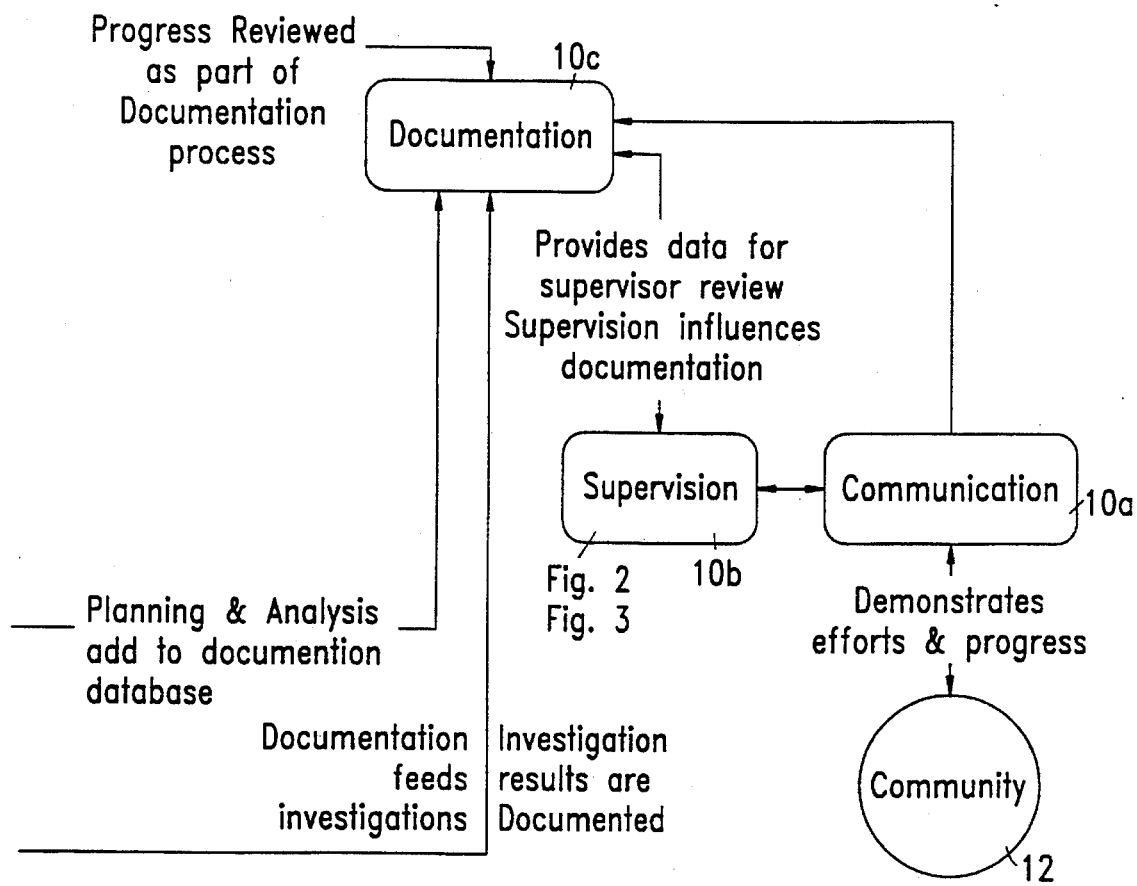

Referring now to the documentation area 42a of main menu screen 40, buttons 44–47 are representative of four tools—a monthly work plan tool (44); a problem definition tool (45); a condition log tool (46); and a meeting report tool (47)—useful in implementing the documentation element (10c) of community policing and tying together the other elements (FIG. 4A) underlying community policing. For purposes of explanation and convenience, FIGS. 4b–d respectively provide flowchart representations of the monthly work plan tool 44 (FIG. 4b); condition log tool 46 (FIG. 4c); and problem definition tool 45 (FIG. 4d) driving the documentation area 42a of the system. The flowcharts conveniently depict the tie-in of each of the elements 10a–10g (FIG. 4A) underlying community policing philosophy.

Turning now to FIG. 4, the monthly work plan 50 is enacted by the user's activation of button 44. Operation of the monthly workplan 50 tool is outlined in the flowchart of FIG. 4b, and it's use is illustrated in greater detail by the various screens shown in FIGS. 5–8.

As evident from previous discussion, the monthly work plan screen 50 indicates an identification of a beat 37 and a temporal period 38 of interest. As presented for purposes of illustration and not of limitation, the temporal period 38 has been set up by month, so that the tool is conveniently referred to as a monthly workplan. However, it will appreciated that the system may be organized to select information on a daily, weekly, semi-annual or any other temporal period 38 as desired by the user, so that the workplan itself might then be called a daily workplan, weekly workplan, etc. The monthly work plan screen 50 defines a tool which assists the CPO to build a "plan" (i.e., part of the strategic planning element 10e of community policing) addressing one or more "problems/conditions" which the CPO would like to address for the upcoming temporal period 38 of interest. Again, for purposes of illustration, FIG. 5 depicts a temporal period of one month (here, the month of November, 1993).

Figure 4B:
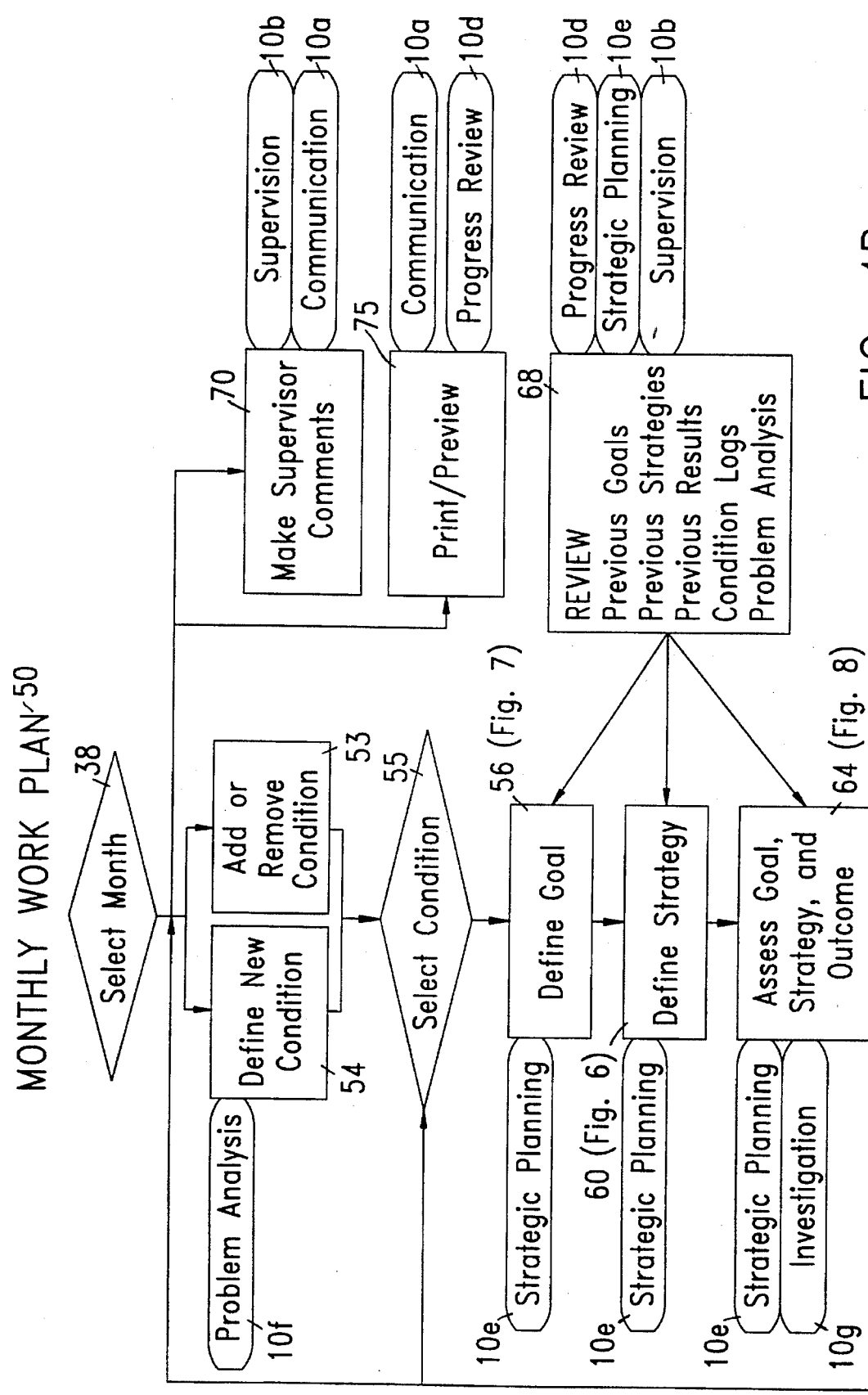
FIG. 4b illustrates in flowchart form a main monthly work plan screen as depicted in FIG. 5, as accessed from the main menu screen of FIG. 4.
Figure 4C:
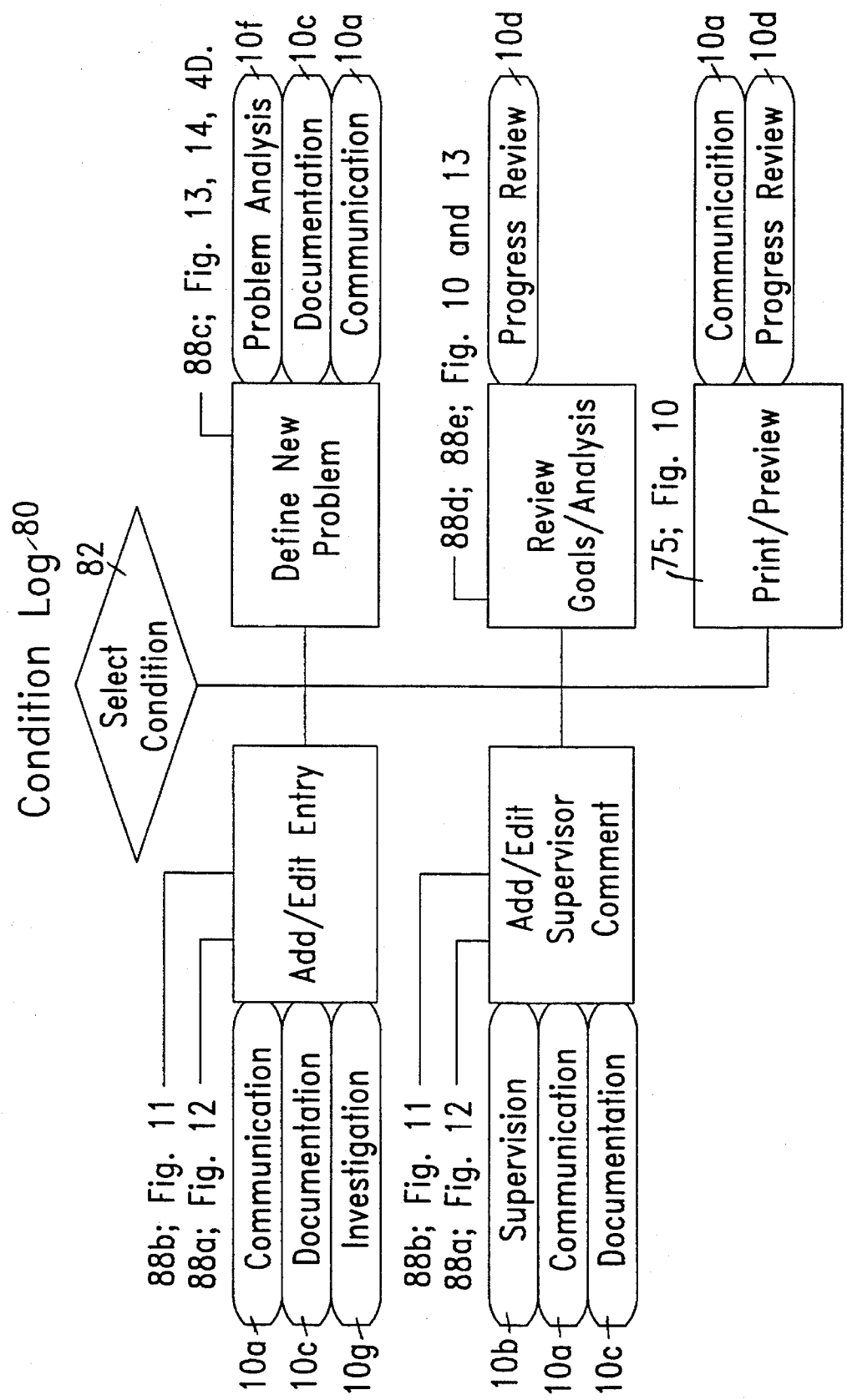
FIG. 4c illustrates in flowchart form a main condition log screen as depicted in FIG. 9, as accessed from the main menu screen of FIG. 4.
Figure 5:
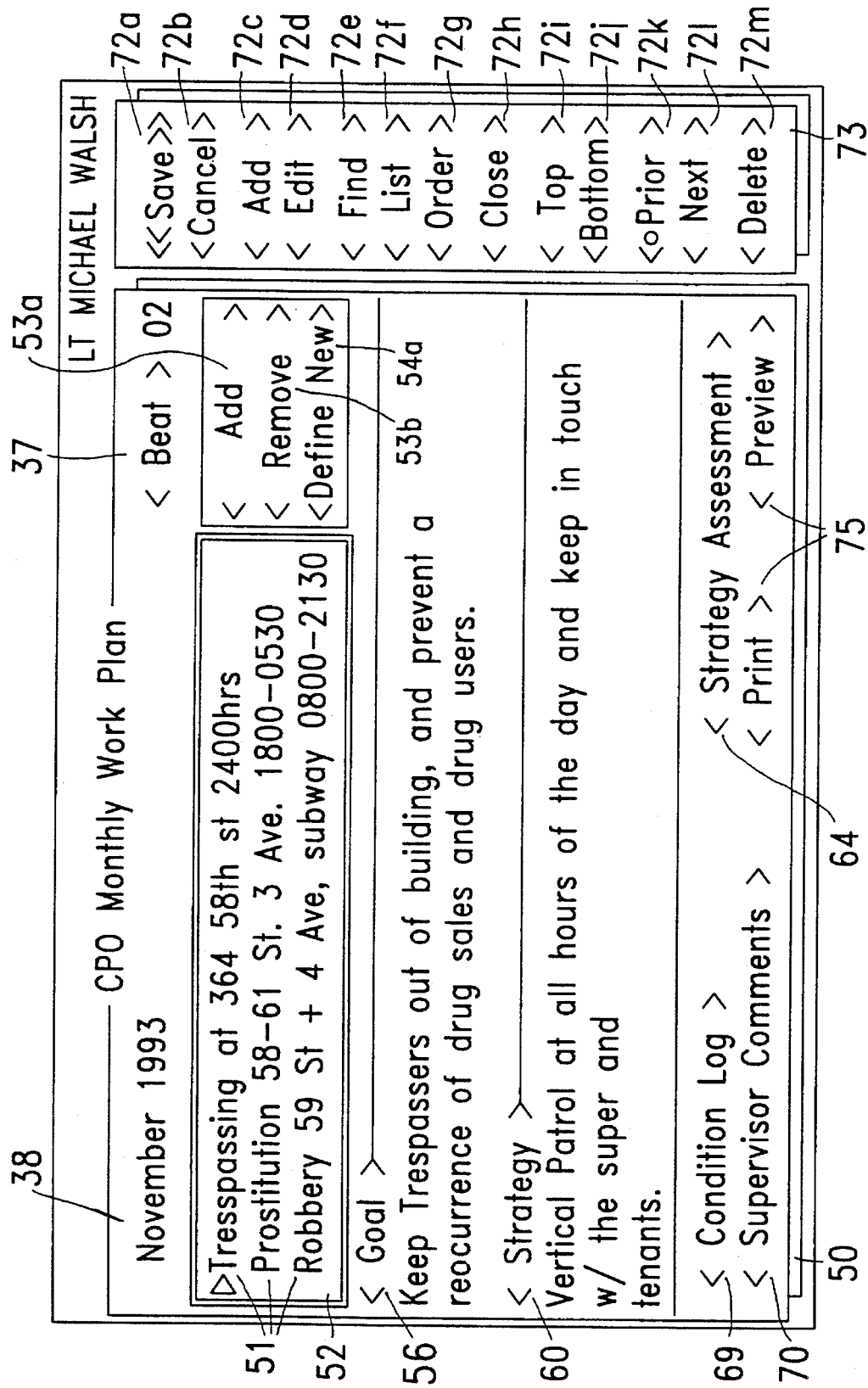
FIG. 5 illustrates the main monthly work plan screen accessed from the main menu screen of FIG. 4.

Referring now to FIG. 5 and the flowchart of FIG. 4B, each problem or condition 51 which will be addressed by the CPO during the Upcoming temporal period may be listed on a highlighted portion 52 of the overall work plan screen 50. Each problem or condition 51 existent or otherwise to be added to the monthly work plan 50 requires definition of a goal 56 (FIG. 7) and strategy 60 (FIG. 6), together with an assessment 64 (FIG. 8) of the goals and strategies and the outcome thereof. A CPO will first select a temporal period 38 of interest (here, for purposes of example only, a monthly designation has been used), and for that period will either add or remove a problem/condition (53) or seek to define a new condition (54) which will be a priority for him during the designated temporal time period. For convenience, work plan screen 50 includes sections to add a condition (53a), or, if not already existing, to define a new condition (54a).

In adding a condition (53a), the system will provide a "pop-up" screen of all conditions which have previously been defined for the beat (37) of interest. Once the condition is added, that condition 51 will appear in the highlighted area 52 of the work plan screen 50. If the condition 51 that the CPO wishes to address has not already been defined on the system, the CPO will have to define a new one (step 54 of FIG. 4B) in a manner which will be described in greater detail herein.

Figure 7:
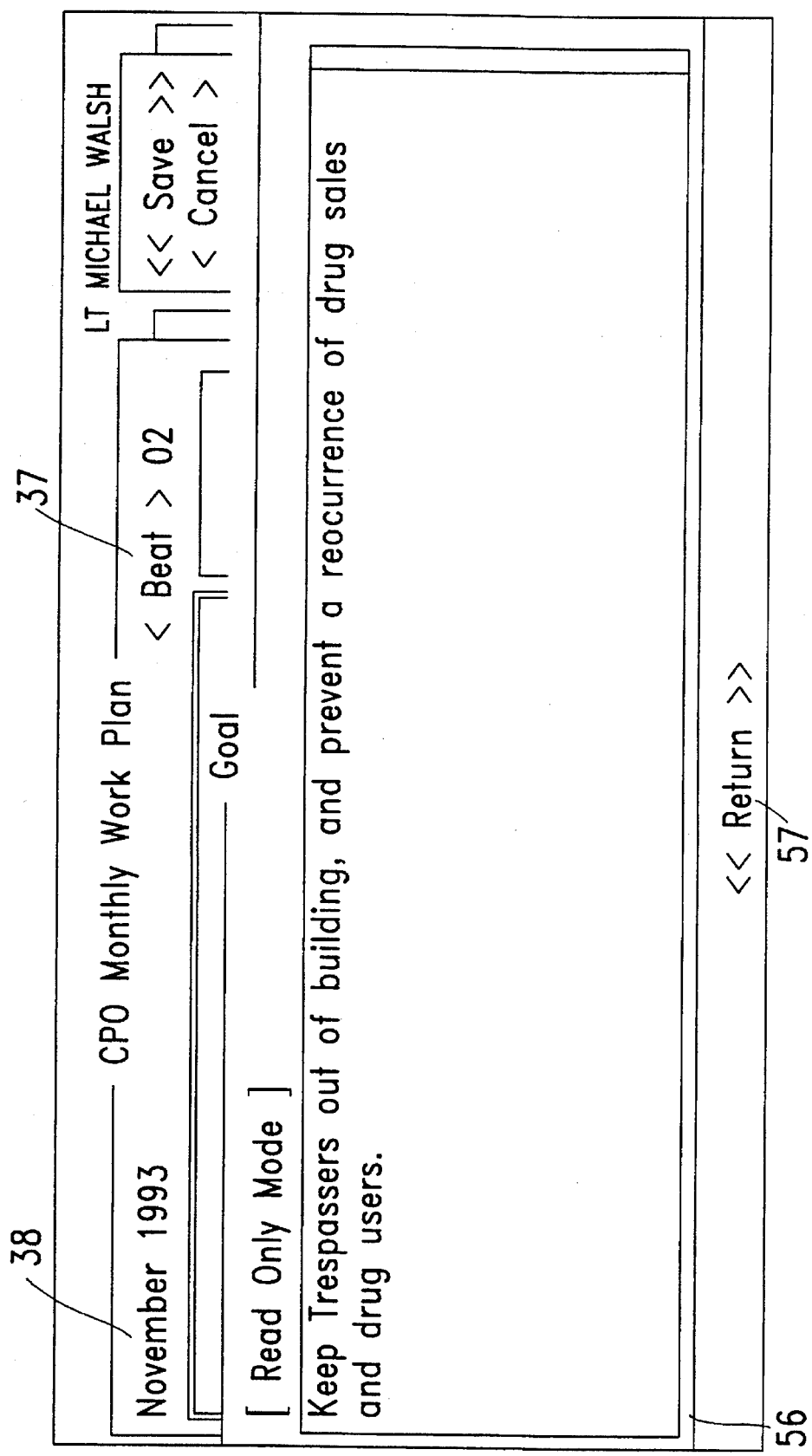
FIG. 7 illustrates a goal subscreen for the main monthly workplan screen of FIG. 5.

The CPO's preparation of his monthly work plan 50 is an interactive process, and it requires him to define a goal (56) and strategy (60) for each condition 51 selected. Thus, the CPO will select a condition (step 55, FIG. 4B) by enacting button 51 and will proceed to define his goal relative to that condition. FIG. 7 depicts a goal definition screen which appears superimposed upon the work plan screen 50 upon activation of button 56. Through use of the screen depicted by FIG. 7, the CPO can type or otherwise enter in free comment form his goal 56 for the particular condition 51. Once completed, the CPO's defined goal 56 may be entered onto work plan screen 50 via the return button 57 on the goal screen of FIG. 7.

Figure 6:
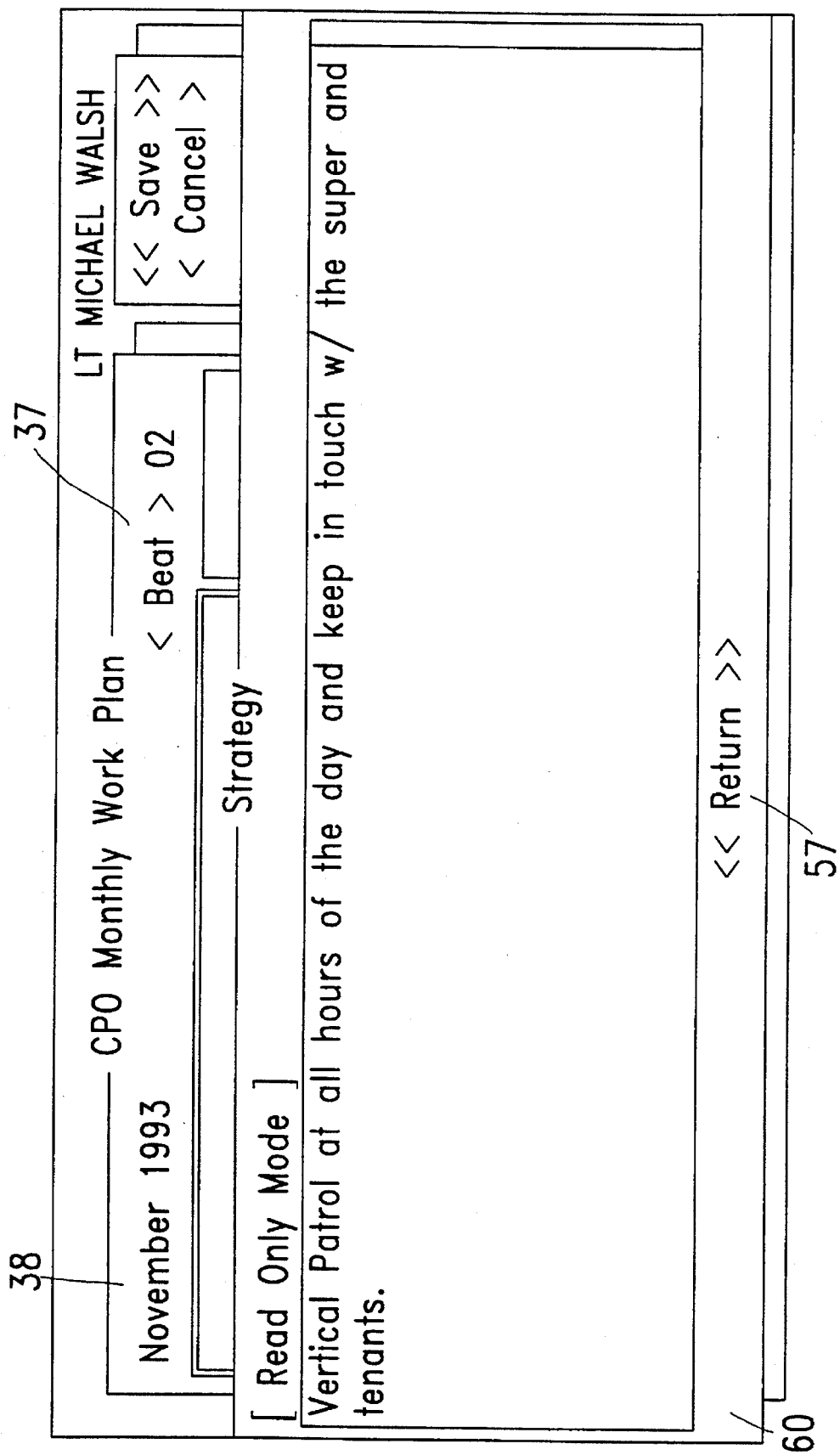
FIG. 6 illustrates a strategy subscreen for the main monthly workplan screen of FIG. 5.

Referring again to FIGS. 4b and 5, following the CPO's definition of a goal 56, the CPO will next define a strategy 60 for that condition 51. FIG. 6 illustrates the strategy definition screen. The process by which the CPO defines the strategy parallels that of defining the goal 56 previously described so that the aforementioned description relative to defining the goal 56 is applicable to defining the CPO's strategy 60.

It should be noted that as the method and system are intended to assist the CPO in formulating a work plan tailored to each temporal period 38 of interest so as to advance the CPO's efforts in solving problems/conditions, the system may be configured to require the CPO to define a goal 56 and strategy 60 for each condition 51 each time a new temporal period begins. To focus the CPO in his progress, this process can be repeated despite the fact that a condition 51 will have been carried over from a prior temporal period 38. In this manner, the CPO is forced to "think" through his prior goals 56 and strategies 60 and interact with any supervisor comments (to be shortly explained), and otherwise advance his efforts to address any particular condition 51. In this vein, it will also be appreciated that the CPO may be assisted in defining a goal 56 and strategy 60 for a particular condition 51 via a "pop-up" screen (not shown) which presents the officer with a list of suggested goals or strategies relative to a particular condition of interest. The "pop-up screen" (not shown) may be gleaned from a database associating prior successful goals and strategies with particular conditions as previously encountered by various of his colleagues.

To reinforce the CPO's progress in his practice of community policing, at the end of temporal period 38, the CPO will be encouraged to review the outcome of his selected goals 56 and strategies 60—and indeed, can be preventing from defining a new work plan 50 for the upcoming temporal period until he has done so—by performing a Strategy assessment 64. Such assessment assists the CPO to progress his efforts in solving problems on his beat. This review should be conducted for each of the conditions 51 designated by the CPO in the temporal period 38 so as to assist the CPO in progressing goals 56 and strategies 60 for the upcoming temporal period 38 should the condition 51 not have been solved.

Thus, FIG. 8 represents a strategy assessment screen which is superimposed upon the work plan screen 50 upon its activation for each condition 51 of interest. To facilitate the CPO's assessment of a plan for the prior temporal period, a series of questions 65a–65d are presented to the officer relative to the status of the problem (65a); whether or not the particular strategy was put into practice (65b); whether or not the-strategy seemed to work (65c); and whether or not the particular strategy would be continued into a following temporal time period (65d). A larger area 66 beneath the series of questions 65a–65d allows the officer to enter any comments he/she may have relative to the goals 56 and strategies 60 chosen to address the condition 51. After the screen 65 is completed for a condition 51, the return button 57 is activated to return to the monthly work plan screen 50. This process is repeated for any existing conditions 51 from the prior temporal period 38 to enable the CPO to formulate a new work plan. Thus, it will be appreciated that the strategy assessment tool 64 will provide feedback to the CPO in preparing a new work plan 50, while providing his supervisor(s) with a basis for rendering advice to the CPO.

Part of the process in community policing not only entails the CPO's review and study of any previous goals, strategies, and results, but his review of any supervisor comments and condition logs for the temporal period 38. As will be appreciated, the feedback the CPO receives from his supervisors will influence the CPO's definition of goals 56 and strategies 60 in solving conditions 51 (step 68 of FIG. 4B). Thus, workplan screen 50 (FIG. 5) includes both a condition log button 69 and a supervisor comment button 70. As will be shortly explained, the condition log presents to the CPO a list of particular occurrences relative to a designated condition 51 on beat 37. The supervisor comment button 70 provides the CPO with a list of supervisor comments relative to the progress of the CPO relative to a selected condition 51. Advantageously, through button 70 an officer with supervisor status may make any desired comments or suggestions to the CPO.

Lastly, referring to FIGS. 4B and 5, a pair of print/preview buttons 75 enable the CPO to print out the monthly work plan to a printer (print button 75) or preview a completed workplan (preview button 75) on the screen of the CRT.

It will be appreciated, then, that the various work plan screens tie in many of the interactive elements 10a–10g underlying the philosophy of community policing. The relationships between various of the functions described in using the work plan screens and those elements 10a–10g are illustrated in FIG. 4B.

Generic to numerous of the screens utilized in the method and system according to the invention are a plurality of screen "navigation" buttons 72a–m. The navigation buttons 72a–m are conveniently located in a vertical dialog box 73 to the side of various of the screens (here, depicted adjacent work plan screen 50). The screen navigation buttons 72a–m are employed by the user to navigate through a quantity of entries to be retrieved by the user onto the particular screen he/she is currently employing. Thus, while these buttons represent functions generic to subsequent screens to be described herein, for purposes of example and explanation, in the context of the work plan screen 50, the add button (72c) will add a new work plan; edit (72d) is enacted to edit an existing plan; find (72e) provides a dialog list of existing work plans for a particular beat, indexed, for instance, by temporal work period; list (72f) will list the work plans in a list format; order (72g) determines the order in which the: work plan records are presented to the user; close (72h) is the; exit button for the system; the top (72i), bottom (72j), prior (72k) and next (72l) buttons are used to navigate to the first work plan, latest work plan, prior work plan, or next work plan, respectively, established for a particular beat; and delete (72m) will delete the work plan the CPO is currently working on.

Turning our attention now to FIGS. 4, 4c and 9–14, a problem or condition log button 46 is provided in the documentation area 42a, to activate the CPO's use of a condition log tool 80. The main screen of the condition log 80 is depicted by FIG. 9, and its flowchart of operation is exhibited at FIG. 4C. FIG. 9 depicts a list of pre-existent conditions 81 that have already been defined by the CPO for his beat 37. As illustrated, the conditions 81 may be listed in a rank order of priority 82 depending on whether the conditions are currently in an "active" status, or whether those conditions are somewhat less active so that they are simply being "monitored" by the CPO.

Should the user wish to explore in better detail a condition 81 of interest, the user may activate the desired condition (step 82 on FIG. 4C) via the mouse or other entry means to cause a second screen 85 (FIG. 10) to appear. Screen 85 depicts a detailed "entry log book" in the condition log 80 containing a series of entries 87 for the particular condition 81 of interest. The particular condition 81 to which the second screen 85 pertains is itself displayed at the top of screen 85. As seen in screen 85, the officer is presented with a list of entries 87, in reverse chronological order, identifying the police officer making the entry and the date that the entry was made. At any time the CPO wishes to return to the main screen (FIG. 9) of condition log 80, he need only activate condition 81 as displayed at the top of screen 85.

Once the officer is operating in the entry log screen 85, he may scroll through the entries 87 to review them. Should the officer or his supervisor wish to add a new entry 87 or edit an existing entry 87, he/she might activate button 88a which would cause screen 90 (FIG. 12) to appear in the log. For purposes of illustration only, button 88a is designated "add supervisor comment" indicative of an individual user having supervisor-level status; however, it will be understood that for a user with non-supervisor status, the button 88a will appear on screen 90 as "add comment." Once in screen 90, the user may add his/her appropriate free-form entry 87 relative to the condition 81 or, as shown for illustrative purposes in FIG. 12, edit a pre-existing comment 87. Once added or edited, the user may save (72a), cancel (72b), or delete (72m) the comment 87, as desired, and return to the condition log screen 85 of FIG. 10 to review that added or edited entry 87.

Referring again to FIG. 10, a button 88b labeled "edit comment or entry" is provided to edit a comment or entry 87. When enacted, a screen 91 (FIG. 11) is retrieved which presents, for example, in reverse chronological order and by author, a history of entries 87 which may be edited by the user (the full text of those entries 87 being available to the user at screen 85 of FIG. 10). To avoid inadvertent editing by a CPO, at this level the beatbook may be formatted to permit a user to edit only those comments 87 which were made by him for that beat 37. In the case of a supervisor, the beatbook may be formatted so that the supervisor may edit any comments 87 of those individuals whom he outranks. Once the user has selected an entry 87 from FIG. 11, enaction of that entry will return the user to the condition log screen 85 of FIG. 12 for editing of the selected comment 87 in a manner previously described.

Figure 13:
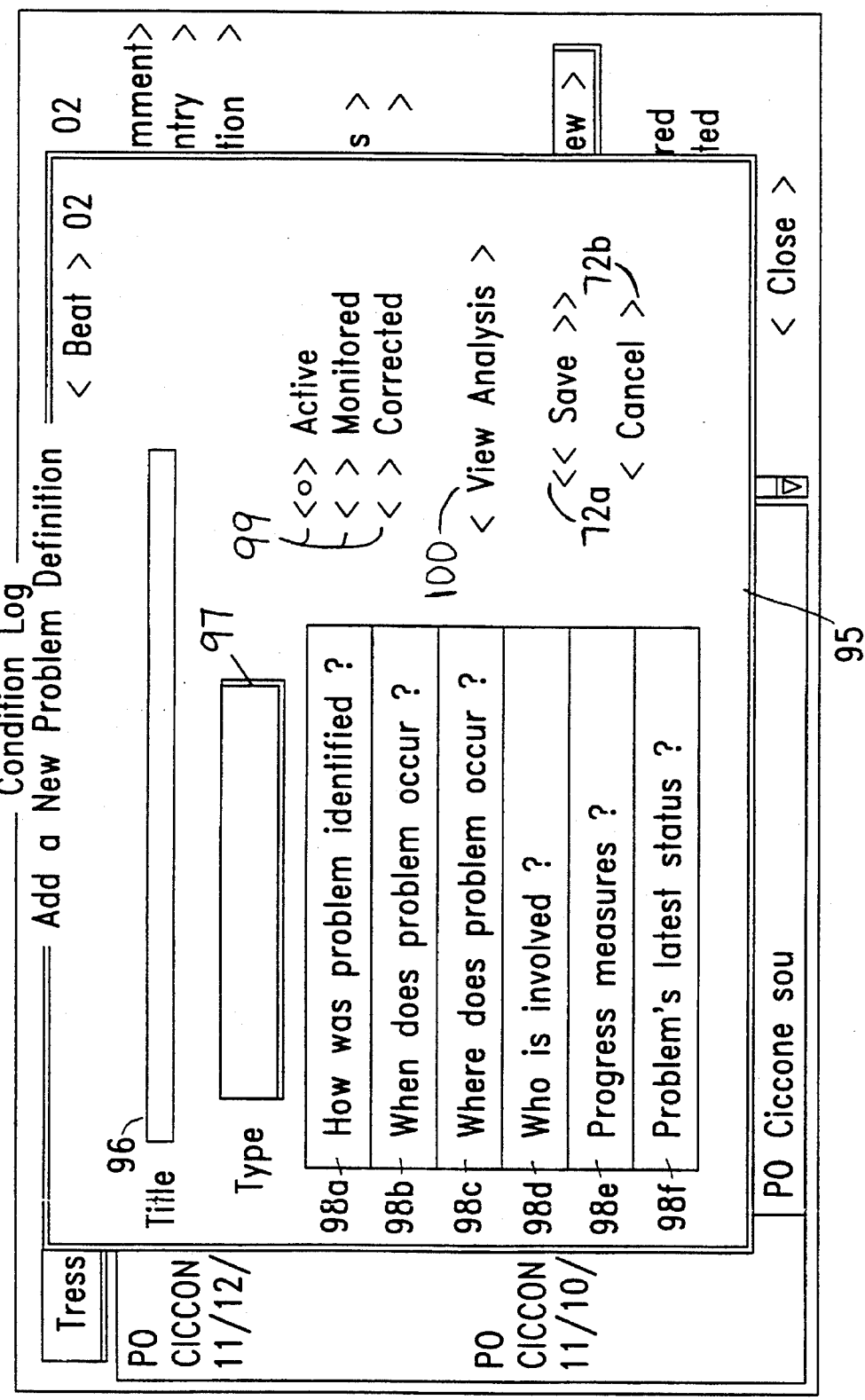
FIG. 13 depicts a screen for defining a new problem/condition to be added to a police officer's beat.
Figure 14:
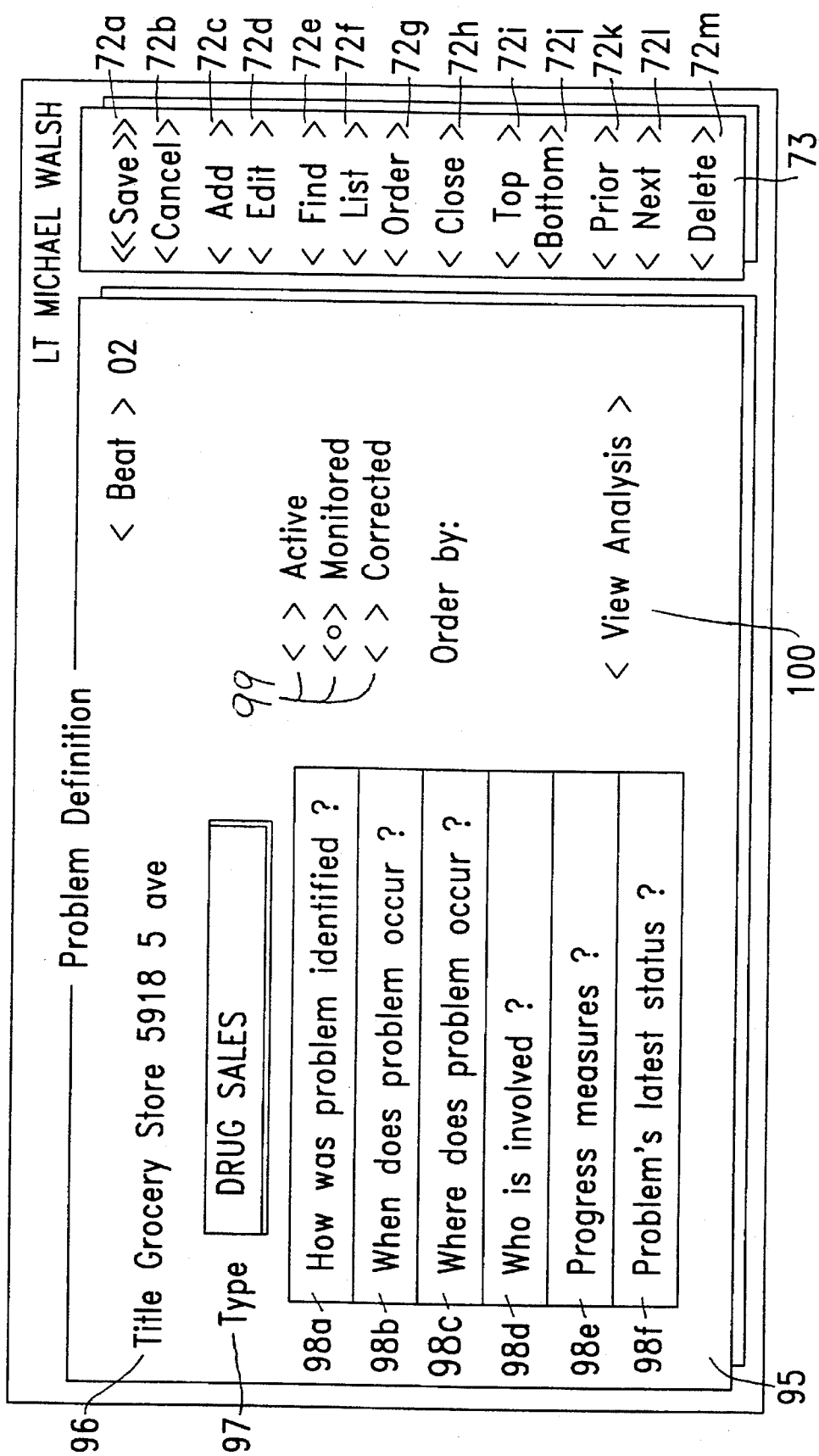
FIG. 14 depicts a screen for defining a problem/condition, as accessed from the main menu screen of FIG. 4.

Referring again to FIG. 10, button 88c, "define new condition", is enacted by the CPO when a new condition/ problem is to be defined on the condition log (typically, when that condition or problem does not yet exist on the system). FIG. 13 represents the screen 95 used to define a new condition 87. Screen 95 includes a box 96 for titling that condition, together with a second box 97 for categorizing the condition according to a general category (e.g., "robbery", "trespassing," "drug sales," etc.) which may be chosen by the user from a dialog list (not shown) of predefined condition types that appears on screen 95 upon enaction of button 97. FIG. 14 depicts an example of a completed condition screen 95 illustrating a problem definition by title 96 ("Grocery Store 5918 5 ave") and type 96 ("Drug sales").

Screen 95 also includes a listing of six boxes 98a–f which provide a series of analysis questions regarding the new condition 81 being defined by the CPO. Each of the buttons 98a–f are separately enacted, at which point a free form text screen (not shown) will be retrieved allowing the CPO to answer the particular question (98a–f) to further his analysis of the condition that he/she is defining. In order to further the system's usefulness as a feedback mechanism guiding the CPO in his practice of community policing, the system may be formatted to include a few lines of comment on each text screen to guide the CPO as to an appropriate manner and answer approach for each question 98a–f. As will further be appreciated, screen 95 also includes a series of buttons 99 to classify the newly defined problem as having an "active", "monitored", or "corrected" status 82 (see FIG. 9). The status 82 of the condition can be changed by the CPOs or by their supervisor(s). Lastly, a view analysis button 100 will provide (not shown) a screen preview of the responses to all six questions 98a–f for overall review by the user. By saving the screen 95 (via button 72a) the user will be returned to the main screen 80 (FIG. 9) of the condition log with that new condition 81 added to the list.

Returning now to FIG. 10, to foster the CPO's thought analysis of particular problems or conditions, a problem analysis button 88d is provided which will permit the CPO to perform an analysis of the problem 81 of interest. When button 88d is activated, the answers to questions 98a–98f (FIG. 13) are presented to the CPO so that he may analyze the condition 81 after the work plan 50 has been enacted by him and practiced over a period of time. Similarly, button 88e, "review goals" will give the CPO a picture screen (not shown) of all goals 56 And strategies 60 established for that condition 81 at any time they have appeared in a current or previous monthly work plan 50 for that beat 37. Thus, the CPO is provided with valuable feedback to further his progress in the community policing process.

Condition log screen 85 also includes a pair of print/preview buttons 75 permitting a hard copy print or screen preview of the condition log, utilized in a manner as described for work plan 50. Buttons 88f and 88g, "include monitored" and "include corrected" respectively, govern the appearance of screen 80 of FIG. 9. If a condition 81 has been designated as "monitored", a condition with that status 82 will normally appear to the user on screen 80 (as in the case with screen 80 depicted at FIG. 9). However, should a condition 81 have been previously resolved (i.e., "corrected" by the CPO), that condition would not necessarily appear on screen 80 unless so designated by the user through button 88g.

Figure 4D:
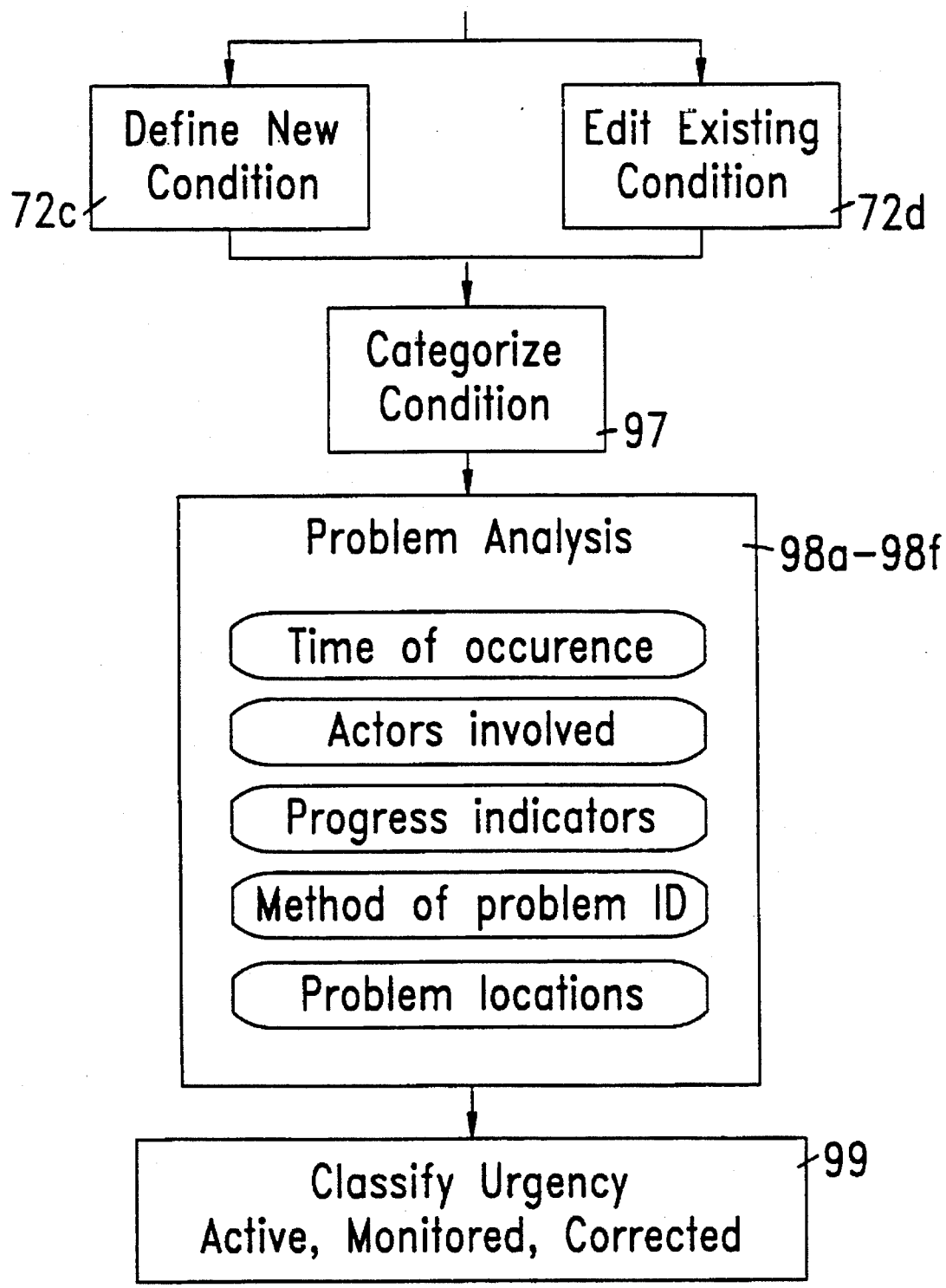
FIG. 4d depicts in flowchart form a main problem definition screen as depicted in FIG. 14, as accessed from the main menu screen of FIG. 4 or the main condition log screen of FIG. 9.

While substantially touched upon in some detail above, FIG. 4D represents the flowchart of a problem definition tool 45 provided by the system and method of the invention. The problem definition function 45 can be variously accessed from the main menu screen 40 (under documentation box 42a) of FIG. 4; from the workplan screen 50 of FIG. 5 (by enacting a desired condition 51 from screen 52); or from the condition log 85 of FIG. 10 (via button 88c). The problem definition screen that is depicted by FIG. 14 represents a more in-depth definition of a problem than the condition screen 95 of FIG. 13. As with the workplan screen 50 of FIG. 5, the problem definition tool (FIG. 14) includes a vertical dialog box 75 containing a variety of problem manipulation buttons 72a–72m through which the user can manipulate a multiplicity of problems 81-i.e., add, edit, find, list, order, etc. each of the problems 81—in a similar manner of function as previously described for the workplan screen 50 of FIG. 5.

Thus, referring to FIG. 4d, to use the problem definition function 45, one either defines a new problem 81 by enacting the add button 72c, or chooses to edit an existing problem 81 by enacting the edit button 72d. Next, the problem is categorized according to type 97 as previously explained, after which the series of questions 98a–98f are answered in a manner previously explained to analyze the problem. Lastly, the status of the problem (active, monitored or corrected) is indicated through the buttons 99 of FIG. 14, again as previously explained. Once the problem is defined, it will appear on the condition log screen 80 of FIG. 9 as also previously described.

Figure 15:
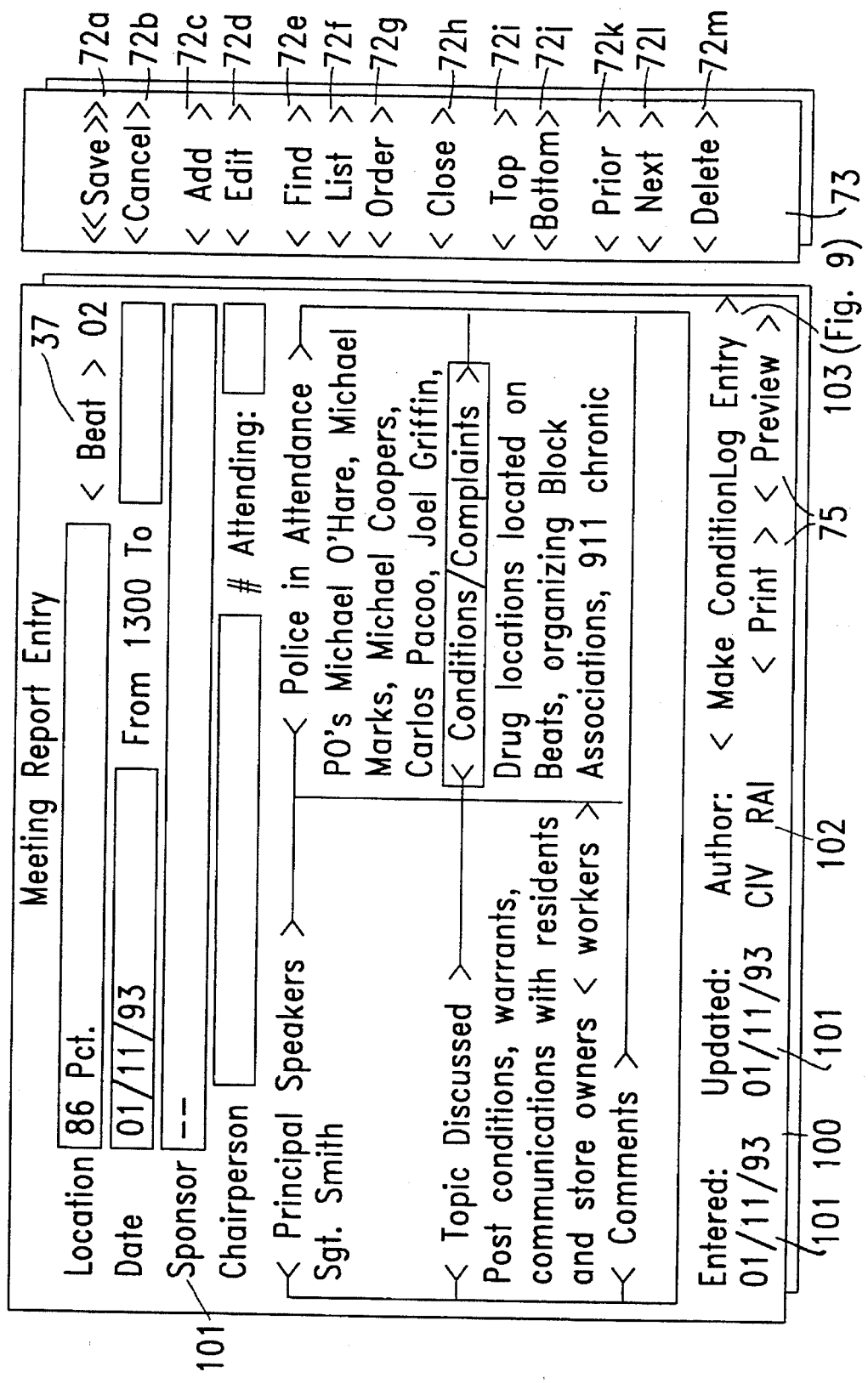
FIG. 15 illustrates a meeting report screen for tabulating details of meetings, as accessed from the main menu screen of FIG. 4.

The community policing philosophy stresses the interchange and communication of information between CPOs, their supervisors, and the community. As such, part of the CPO's documentation efforts 42a (FIG. 4) will include recording certain aspects of meetings held with other CPOs and/or supervisors relative to problems and conditions existent on the beat. The system according to the invention thus provides a meeting report function button 47 allowing access to a meeting report tool 100 (FIG. 15). The meeting report tool 100 enables the CPO to cross reference and document certain information 101 relevant to a meeting of interest. Such information 101 may include: meeting location; date of meeting; sponsor of meeting; speakers who attended; topics discussed; and conditions to which the meeting pertained. For convenience, the screen 100 will display with the information 101 the dates relative to entry and update of the report, as well as the author 102 making the report. As with the condition log 80 and workplan 50, the report may be hardprinted or previewed on the screen via use of buttons 75. Navigation buttons 72a–72m will allow a CPO to manipulate the various meeting reports 100 contained in the system in a similar manner of function as previously described.

To foster the CPO's use of the meeting report tool, a "make condition log entry" button 103 is provided on the meeting report 100 to permit the user to link a particular meeting report 100 with any related conditions 81 listed on the condition log 80 depicted in FIG. 9. That is, to assist the CPO to link the information of any meeting 100 which might prove useful, for instance, in addressing a given condition 81, button 103 is enacted by the user to (not shown) present the user with the complete list of conditions 81 found on the condition log 80. The user would then be permitted to designate which of those conditions 81 are relevant to the discussion held at the meeting 100. For illustrative purposes, utilizing the example of FIGS. 9 and 15, the user might link the topic of the meeting 100 (robberies) with the third and fourth conditions 81 (e.g. robberies) found on condition log 80. The system would (not shown) automatically generate an entry on the condition log 80 relative to the particular meeting 100 so that when a CPO is investigating a particular condition 81 on the condition log 80, he may be alerted that the meeting report 100 might provide some information of interest. Additional description regarding the making of a condition log entry is provided in regard to the crime report search tool 108 to be described below.

Referring now to FIG. 4, the investigation box 42a contains a series of applications representative of certain functions involved in the CPO's investigative efforts in the practice of community policing. Investigation box 42a includes a "reports" button 105; a "keyword" search button 106; a "911 analysis" button 107; and a "UF-61" analysis button 108.

Figure 16:
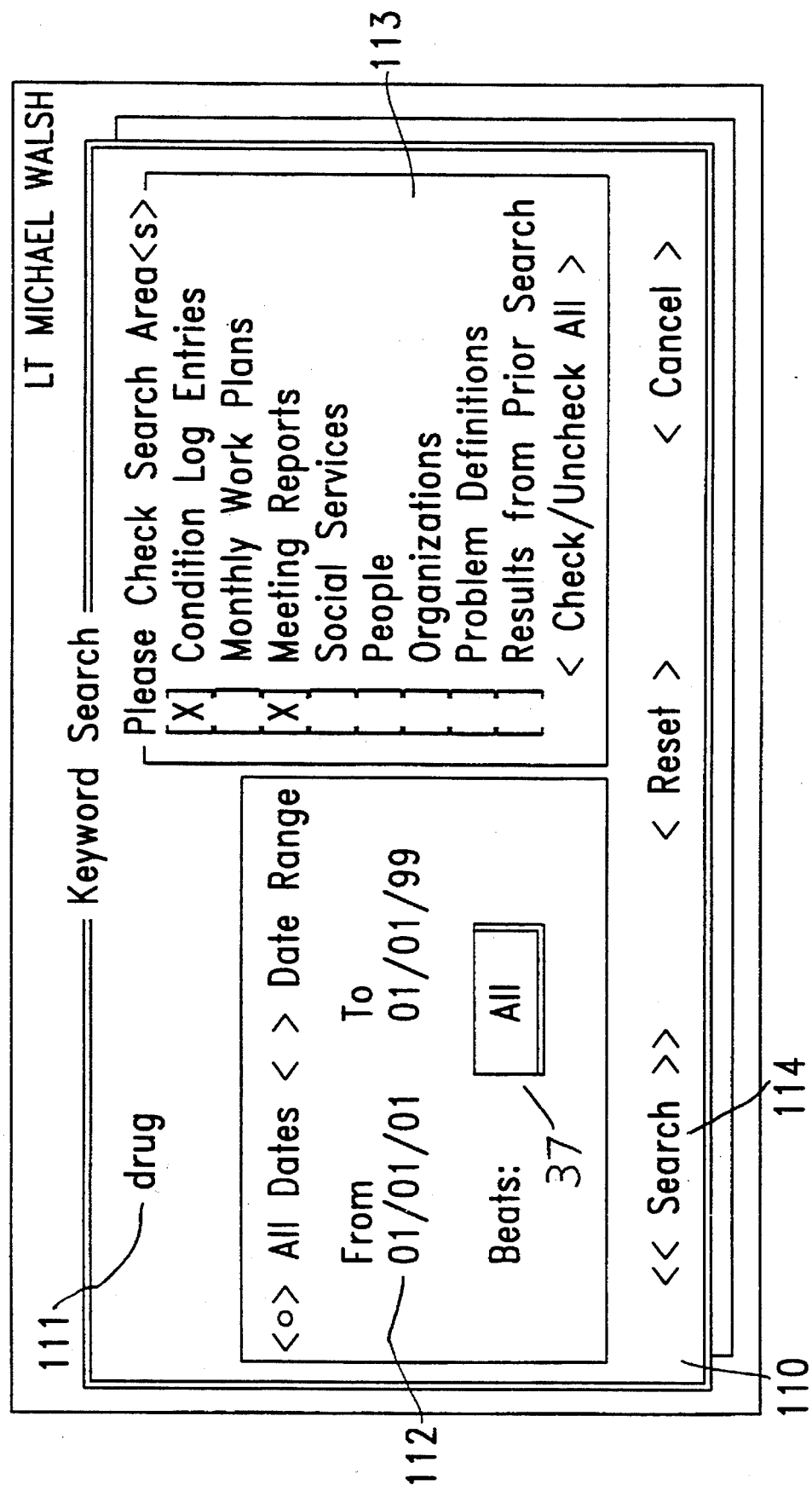
FIG. 16 illustrates a main screen for a keyword search function, as accessed from the main menu screen of FIG. 4.
Figure 19:
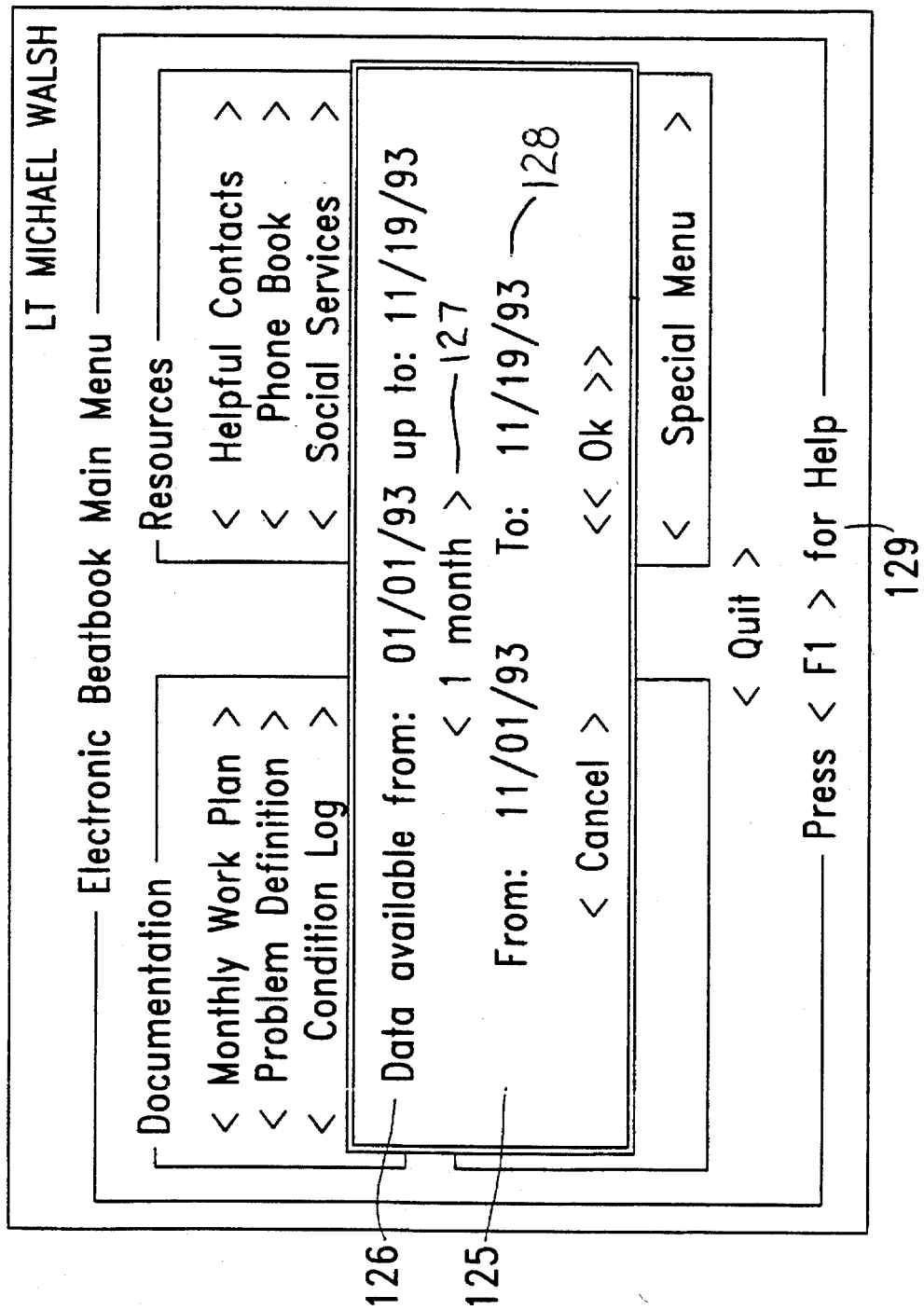
FIG. 19 depicts a main screen for analysis of 911 call information, as accessed from the main menu screen of FIG. 4.

Turning to FIG. 16, a keyword search screen 110 is presented to the user upon activation of the key word search button 106. A purpose of the keyword search application 106 is to enable the CPO to rapidly derive information from various parts of the system depending on a topic of interest. In this regard, a topic search string 111 is typed by the user into a box on the screen 106, together with a date range 112 of interest to the user. If no date range is indicated, the system will search "all dates" as exist on the system, as is depicted for purposes of example in FIG. 16. Similarly, any one or more beats 37 of interest may be indicated, with a default of "all" available beats chosen by the system should no particular beat be chosen (as in the case depicted by FIG. 16). To speed up the search, a user may indicate on screen 110 one or more "search areas" 113 representing individual parts of the system (condition log entries, monthly work plans, meeting reports, etc.) that may be of particular interest. Once the search parameters are noted, the search button 114 is enacted to perform the keyword search to derive entries of interest relative to the search string 111.

FIG. 17 is exemplary of a search results screen 115 for the keyword search executed in FIG. 16. The search results screen 115 will display the search string 111 and the number of matching entries 116 uncovered by the search. As activated by the user, screen 115 will then proceed to display, one record at a time, each of the uncovered entries 117, identifying the search area 113 where the entry was found (i.e., was the entry from the condition log, from a monthly work plan, etc., as selected by user on screen 110 of FIG. 16) together with the beat 37 associated with that particular entry 117. As depicted for purposes of illustration in FIG. 17, entry 117 is an entry from a condition log associated with beat no. 1. The entry 117 includes, for instance, a title portion 117a (here, the title of the condition 81), together with the actual entry 117b associated with the title (i.e., condition). As with other screens previously described herein, various data navigation buttons 118 are provided to allow the user to manipulate the results of the search (i.e., to go to the top of the search entries, view a prior entry, view the next entry, delete an entry from the search results, etc.) in a manner as previously explained.

Should a user wish to further narrow the field of search to pare down the number of entries 116 to be viewed, he/she may enact the close button 118 to return to screen 110. The original search string 111 may be modified as desired by the user (i.e., the search string 111 depicted in FIG. 16 may be narrowed, for example, from "drugs" to "drugs and crack cocaine"). Upon enaction of the search button 114, the results 116 of the prior search will be further searched according to the modified search string 111 entered by the user. The results, of course, may be printed or previewed (button 118, FIG. 17) in a manner previously described, with FIG. 18 representing a screen 119 allowing the user to define certain printer information 120 (such as type of printer, font size or type, etc.) relative to a hardcopy print of the search results screen 115.

In furtherance of the officer's investigative function and to otherwise advance his goals and progress relative to his beat, a tool is provided to-assess "911" call data. Returning to FIG. 4, button 107 allows a user to search a log of all known "911" emergency call reports in an effort to provide the officer with information of interest relative to a particular neighborhood. Upon enaction of button 107, an initial 911 call analysis screen 125 will be retrieved (FIG. 19) indicating to the user the dates (126) for which 911 call data are available. To avoid searching the entire date range 126, a default date range (127) is utilized so as to provide the officer with the 911 call data available in that range. The default date range 127 can be changed by the CPO as desired by enacting that button. The actual dates 128 for the default date range 127 are also indicated on screen 125.

Upon enacting the "ok" button 129 on screen 125, the second 911 analysis screen 130 of FIG. 20 is presented. Screen 130 lists a plurality (131) of 911 calls for the default date range 127 indicated. The plurality of calls retrieved by the system may be organized, as desired, by use of the call organization buttons 132 on screen 130. For purposes of example, the calls 131 are listed in FIG. 30 in descending order of call frequency (i.e., the "by # calls" button 132) per location, here designated by street number addresses (i.e., the "inside" button 132), according to a particular beat 37. Depending on the appropriate selection of call organization buttons 132, the searched 911 calls 131 may also be displayed on screen 130 according to location; according to calls occurring "outside" on the street, instead of at a particular street address; by "Sector" (a plurality of beats); or according to any organizational category of interest as may be envisioned. If desired, the time range 133 of the calls to be displayed can be altered by the user; the default date range 127 can be altered to display more (or less) 911 information on the screen, as desired; and the CPO can indicate whether all locations 134 for 911 calls are to be displayed, or whether he wishes to view only a designated number of locations (here, 10) correlated to the highest frequency of calls.

Should the results of the 911 call search pique the CPO's interest as to any particular location 131, the CPO may wish to view the particular 911 call entries for that location 131. By enacting, on screen 130, the particular location 131 of interest, the user is presented with all 911 entries for that location, as depicted by screen 135 in FIG. 21. Here, the first location 131 has been chosen by the user. FIG. 21 also provides basic information (date range 128, beat 37, time 133, etc.) relative to the information on the screen. A summary of available comments 136 for each of the 911 calls of the location 131 is also provided. As with other screens, the officer may print it or preview it (through buttons 75), or he may otherwise return (button 137) to the 911 analysis screen of FIG. 20. If the officer deems necessary, he can make a condition log entry to link a particular 911 analysis result screen 135 to any of the conditions 81 displayed on FIG. 9, in a similar manner as previously described for the meeting report 100 of FIG. 15. He may also lodge any comments as to why he deems the particular analysis result screen 135 of interest to one or more of the selected conditions 81.

Figure 23:
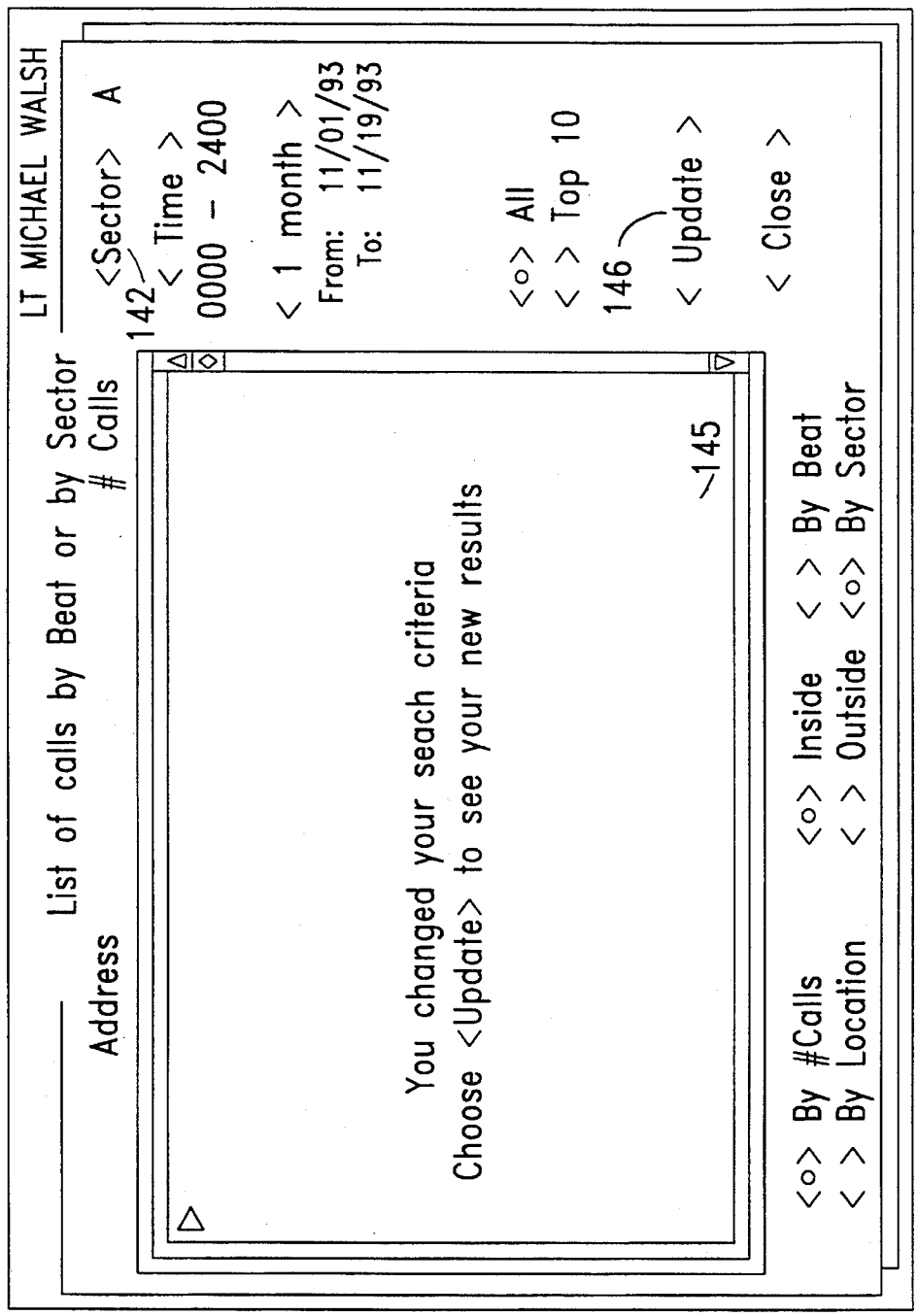
FIG. 23 illustrates an update screen which appears when a user has changed one or more of the 911 call search parameters originally indicated by him on the screen of FIG. 19.
Figure 36:
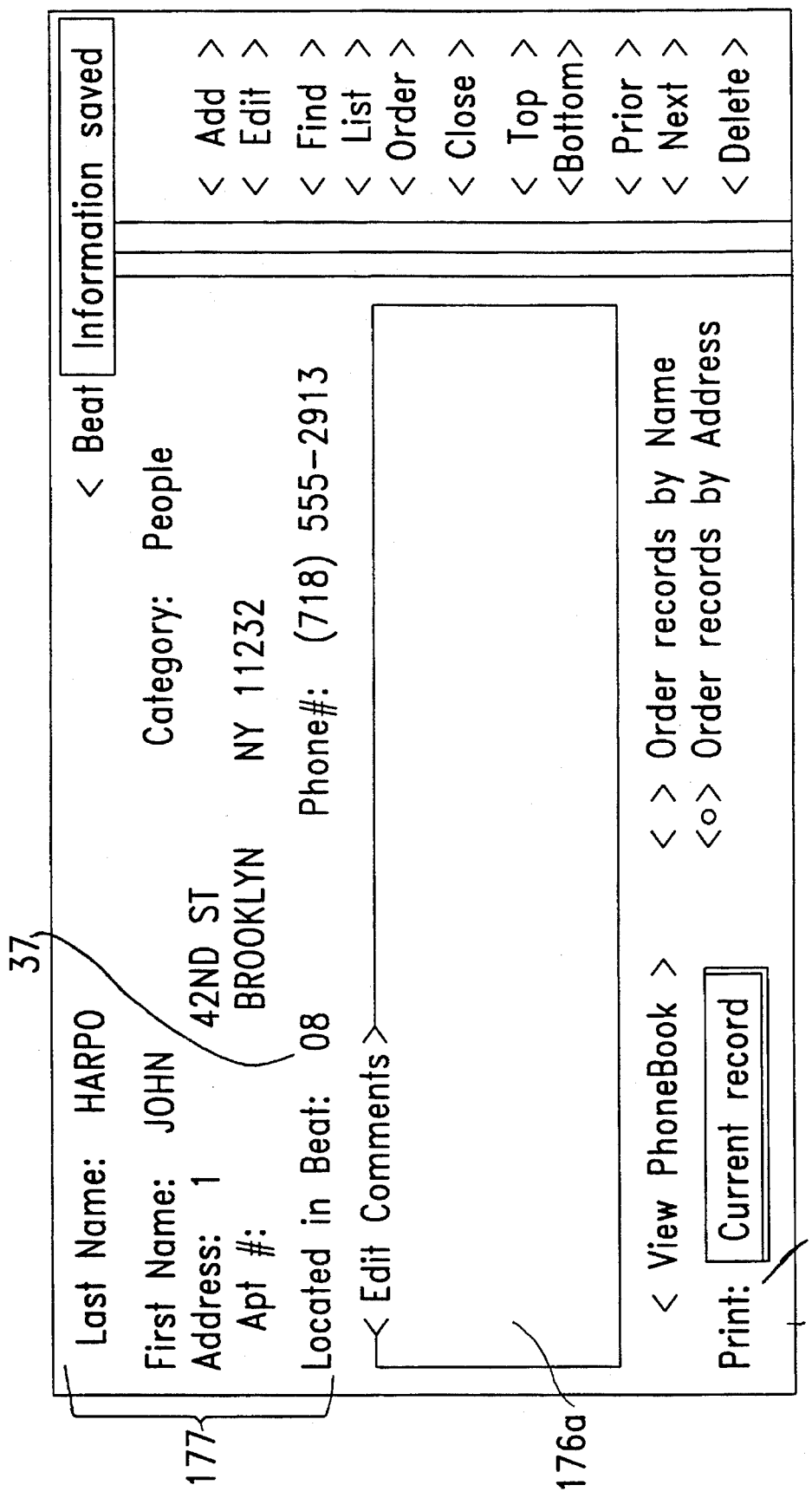
FIG. 36 illustrates a screen for entering or editing information relative to a community contact or resource listed in the phone book screen of FIG. 35.
Figure 39:
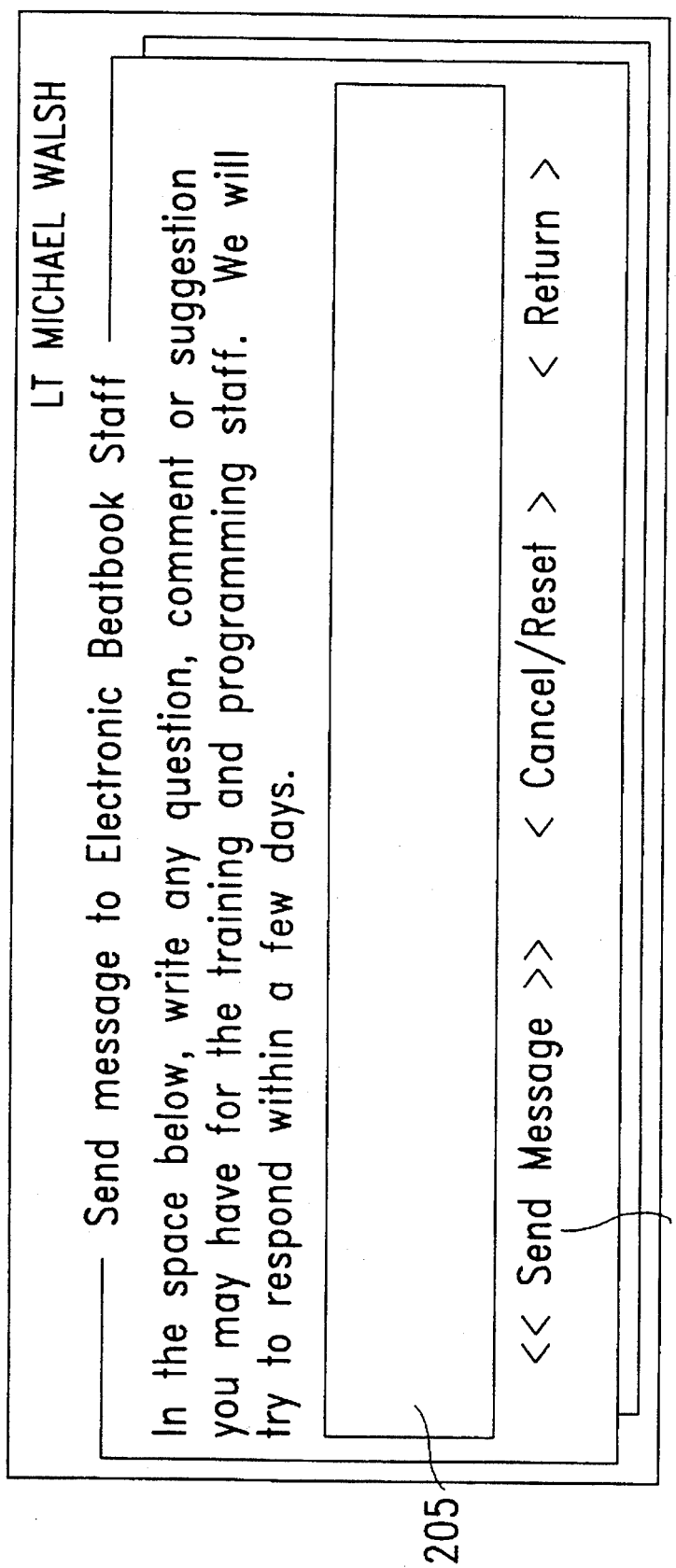
FIG. 39 illustrates a general screen for relaying CPO messages to system programmers or administrators, as enacted from the main menu screen of FIG. 4.

FIG. 22 depicts a screen 140 which is enacted through activation of the "by sector" button 132 on the 911 call analysis screen 130 of FIG. 20. A "sector" is broadly known as a grouping of beats which are patrolled by a radio police car. An appropriate sector 141 may be indicated by the user on screen 140 and upon enaction of the "OK" button 142, the 911 analysis report for the entire sector 141 will be presented to the officer, in lieu of a report for a particular beat 37 as illustrated in FIG. 20. To this end, a screen 145 as depicted in FIG. 23 will appear to the user whenever any of the search criteria are changed via the organization buttons 132. If the search criteria are in fact changed, the results from the prior search are erased and the user is asked to "re-run" his search through enaction of the "update" button 146. Note that in the example depicted by FIG. 23, screen 145 acknowledges that the search criteria have been altered from a particular beat 37 to a sector 142. The results screen 150 for the sector analysis search is illustrated by FIG. 24. Note that as a sector generally covers a larger geographical area than a beat 37, the 911 calls 131 resulting in the sector search will vary from the beat search.

Another investigative tool of great use to CPOs includes a review of crime reports lodged by citizens. As will be well appreciated, almost every police department will have some type of formal report process by which citizens can lodge complaints of criminal activity. In the New York City Police Departments these citizen complaints are known as "UF-61" reports. Turning to FIGS. 4 and 25–34, the system and method according to the invention provides the CPO with a tool to help him analyze crime complaint reports. For purposes of illustration and not of limitation, this feature has been termed "UF-61 analysis" and included as button 108 in the investigative section 45b of the main menu screen 40. It will be appreciated that this tool is readily adaptable to any police department possessing a criminal complaint procedure.

Upon activation of the UF-61 analysis button 108, the main menu screen 155 of FIG. 25 is presented to the user which will allow him to tailor the type of search he wishes to conduct. For instance, through activation of various of crime buttons 156, the CPO may indicate whether he wishes to search crime reports regarding: "all crimes"; "robberies only"; "burglaries only"; "grand larceny auto" (GLA's); any "other crimes"; or only crimes falling under specific sections of a jurisdiction's criminal code ("penal law", PL). Of course, it is understood that any combination or type of crime search criteria can be implemented by the system and method according to a particular area of need or interest to the police department utilizing the tool.

As with the 911 analysis, the UF-61 analysis tool 108 will display for the user the dates 12.6 for which data are available and will permit a user to select a default date range 127 that he wishes to search. Should the CPO be interested in specific facts and wish to further narrow his search, he may utilize one or more of the buttons 157 to specify: a specific location of interest; a time of interest; or types of victim, perpetrator, automobile, weapon, or property involved. Upon enaction of a button 157, a corresponding subscreen will be retrieved by the system for completion of the described information. FIGS. 26–30 depict subscreens for, respectfully, the user's designation of location (FIG. 26); victim or perpetrator (FIG. 27); automobile (FIG. 28); type and specifics of property involved (FIG. 29); or data range 127 (FIG. 30). Once completed via the subscreens, the specific search information will be displayed in the appropriate location of subscreen 158 in FIG. 25.

Once the search parameters are completed, the CPO enacts the "run investigation" button 159 and is presented with a results screen 160 as depicted in FIG. 31. As illustrated for purposes of example and not of limitation, the results screen 160 lists a variety of individual UF-61 crime reports 161 that occurs as the result of a search conducted for "all crimes" (156) for a particular beat (37) in a default date range (127) of interest, all of which having been designated by the user as depicted in FIG. 25. Once the results of the search are available, one or more of the individual crime reports 161 may be selected for further detailed investigation by the CPO, and these individual reports 161 can be designated, for example, by scrolling through each entry 161 on the screen 160 and pressing "enter" on a keyboard, utilizing a mouse input device, or the like as previously described. The designated crime reports 161a are depicted on FIG. 32. Once the designated crime reports 161a are chosen, their associated UF-61 reports may be printed (button 162); similarly, if the user wished to print all the available UF-61 reports 161, the CPO need only activate button 163.

As with the workplan 50 and meeting report 100 in the documentation portion 42a of the main menu screen (FIG. 4), a condition log entry 103 may be established between a designated UF-61 report 161a and a condition 81 of interest on FIG. 9. As depicted in FIG. 34, once the CPO chooses to make a condition log entry 103 relative to a condition 81 for various of the selected UF-61 reports 161a, a comments box 165 will permit him to input or otherwise describe in free-comment format his thoughts relative to the UF-61 reports 161a as they relate to a given condition 81. Upon activation of the "save" button 72a, his comments 165 will be linked to that condition 81 on FIG. 9 via an appropriate prompting entry (not shown) generated by the system and displayed on FIG. 9.

FIG. 33 depicts an illustrative UF-61 report 161a as designated by the user on screen 160 in FIG. 32. Typical of many crime reports, UF-61 report 161a will include data 163 relative to a complaint number; the date and time the report was made; where and-when the crime occurred; data relative to perpetrator or victim; whether the perpetrator was arrested or used a weapon; or like information relative to the crime reported.

The investigation section 42b also includes a tool to generate reports 105 useful to assist the CPO in his investigative function. When button 105 is enacted, a main reports screen 185, shown in FIG. 37, is presented listing in detail a variety of report options 186 available to the CPO. The reports are generated by the system utilizing information available in the various portions—documentation 42a, investigation 42b, resources 42c and other 42d—of the program. By enacting a particular report option 186, the user is guided through one or more screens (not shown) asking the officer how he/she would like the report to appear and what information they would like included in the report. It is, of course, understood that the various report options 186 are not limited to those illustrated or described and may include others as envisioned to those skilled in the art. For instance, should a CPO choose the option 186, "All Supervisor Comments", a series of screens (not shown) would appear to the user asking him whether he/she would like comments relative to a particular beat 37, condition 81, etc.

Part of the CPO's job in implementing goals and strategies to solve conditions in community policing is to be fully cognizant at all times of the various resources available to him. Such resources might include, for instance, certain individuals or groups of influence in the community, or organizations which serve to address a particular need in the community. To this end, referring to the main menu screen of FIG. 4, the method and system according to the invention implements a resource directory 42a of applicable tools 170–172 to assist the officer in his job and to link these resource tools to other areas—particularly documentation 42a and investigation 42b—of the system.

FIG. 35 depicts a main screen 175 of a phone book listings tool 171 for the resource directory 42a. As will be appreciated, the screen 175 displays a plurality of individual contacts 176 identified by name and beat 37, through which the CPO may scroll on the screen 175 as desired. As the user scrolls through the screen by individual contact 176, a portion of the screen will display certain information relative to that contact 176, such as the contact's name, address, phone number, category (whether the contact belongs to a group, is an individual person, etc.) and any free form comments 176a the CPO has relative to that contact 176. By enacting the "enter" button 176b, the user is brought to a second contact-specific screen 180 (FIG. 36) wherein the text of the comments displayed in comments portion 176a (FIG. 35) for a particular listing in the phone book may be edited or entered, as desired. The text of the entry for contact 176 may also be printed by enacting button 180a.

Enaction of the helpful contacts tool 170 (FIG. 4) will retrieve for the user a plurality of contact screens 180 which have been previously established, either through use of the phonebook tool 171 (FIG. 35), or by a user's direct entry into the helpful contacts tool 170. Should the user wish to add a new helpful contact 180 without going through the listings in the phonebook tool 171, the user enacts helpful contact tool 170 to bring up the screen 180 of FIG. 36. The user may then create a new entry and save same, utilizing the navigation "add" button 72a in the dialog box 73. Once a new contact is established, it will be automatically cross-referenced by the system in the phone book listing tool 171 of FIG. 35. As before, the navigation buttons 72a–m will allow the user to manipulate the various contact entries 180 contained in the helpful contacts tool 170 in a like manner of function as previously explained.

A social services resource tool 172 is also provided to the CPO. This tool is extremely useful in helping to identify organizations which might be of service in addressing given problems or conditions on the beat. FIG. 38 depicts a screen 190 containing information for a social service 191 of interest. The screen 190 provides a detailed description 192 regarding the social service 191. The category buttons 193 indicate the services provided by that organization 191. As before, the navigation buttons 72a–m may be used to manipulate the individual screen listings in the tool.

It will be appreciated that each of the resources tools 170–172 are particularly useful to the CPO if used in conjunction with the various investigation tools 105–108, particularly the keyword search 106. For instance, if the CPO has a particular condition he would like to solve (e.g., an alcoholism problem with a citizen on his beat), a key word search (button 106) would present a listing of organizations 191 addressing such problems, if those options were chosen by the user on screen 110 of FIG. 16.

Part of the usefulness of the system and method according to the invention lies in its ability to give the user a chance to interact with its function and to suggest improvements or make other comments relative to its features, organization, or the like. Turning to the miscellaneous area 42d of main menu screen 40, a button 200 is provided to allow CPO feedback about the system. Upon enaction of button 200, a screen 205 (FIG. 39) is provided to allow the CPO to enter any free-form comments the CPO would like to relay to programmers or administrators of the system. By enacting the "send message" button 206, the CPO may relay the text of his comments screen 205 to a central location over a LAN, wireless network, an electronic mail system or the like, so that same may be retrieved and reviewed by system programmers and administrators.

A beat overview tool 201 is provided to permit a CPO to quickly access the overall "status" of his beat relative to conditions and workplans established to address conditions. Upon enaction of tool 201, the user is presented with a screen 400 (FIG. 42) providing the user with condition information relative to a particular beat 37. As shown, all conditions 81 encountered on the beat are listed, together with information relative to condition status 99 (active, corrected or monitored); the frequency (400) of condition log entries for each condition 81; the number of workplans (402) addressing the condition; the most recent work plan (403) addressing the condition; and when the condition was first identified on the beat (404). By use of the beat overview tool 201, a CPO may rapidly access information relative to his beat, quickly identify workplans addressing a condition, and otherwise obtain feedback and accelerate his/her progress towards solving a problem/condition. Upon enaction of any particular condition 81 listed on the overview screen 400, the system will retrieve associated condition log entries and workplans, together with any supervisor comments therein, as explained before with reference to screen 36 of FIG. 3.

Finally, system administrators may update the system utilizing a "system menu" tool 202 to access a maintenance screen 210 (FIG. 40) to add, change, or delete various system parameters 215 such as authorized users, passwords, shield numbers assigned to CPOs, beats 37, or the like. File sizes, usage statistics, etc. would also be available to the programmer.

Thus, it will be appreciated that the system and method for data input and analysis according to the invention provides a convenient, user friendly approach to integrating the various functions practiced by the officer—documentation, investigation, resource management—in community policing. The system and method assist the CPO to link the various tools in a systematic manner which will further his goals and strategies relative to conditions encountered in the community, and will greatly assist the CPO in his thought processes and problem solving efforts in community policing. The method and system greatly advance the efforts of the CPO by providing him with valuable feedback from supervisors, other users, and the community. The system and method conveniently interrelate the elements underlying the philosophy and practice of community policing, allowing the CPO to receive better feedback and to be more effective in his job.

It will be apparent that other and further forms of the invention may be devised without departing from the spirit and scope of the appended claims, it being understood that this invention is not to be limited to the specific embodiments shown.

I claim:

1. A computer-implemented community policing system, comprising:

an electronic data entry and processing apparatus including:
    a processor;
    a memory;
    data entry means for inputting data and command signals; and
    display means for displaying screens associated with a plurality of functions;

where said processor is programmed to provide the following functions:
    a condition log function that displays a condition log screen having a complete problem list that identifies problems in said beat area, and where each of said problems is associated with a list of particular occurrences relating to that problem and entered by said user and stored in said memory;

a work plan function that displays a work plan screen having a problem list that identifies one or more of said problems to be addressed by a user in a beat area, where said problems are each associated with goal data, strategy data, and assessment data entered by said user and stored in said memory, and where designation by said data entry means of one of said problems displayed on said work plan screen activates a cross-reference to said list of particular occurrences relating to said designated problem;

an emergency call report function that searches a log of emergency call data in response to user input, where designation via said data entry means links emergency call data from a search result to one of said problems, and where said linkage is indicated by said condition log function;

a crime report function that searches a log of crime reports in response to user input, where designation via said data entry means links a particular crime report to one of said problems, and where said linkage is indicated by said condition log function; and a supervisor comments function that aggregates and displays a plurality of supervisor comments entered in different functional areas of said system.

2. The system of claim 1, wherein a plurality of said data entry and processing apparatus are connected to a central server for the common sharing of data amongst a plurality of users.

3. The system of claim 1, where said user is required to define said goal data and said strategy data for said problems each time a new time period begins.

4. The system of claim 1, wherein said processor displays on said display means a list of suggested goals or strategies relative to a particular problem, whereby said user is aided with respect to said particular problem.

5. The system of claim 1, wherein said user is prevented from defining a new work plan until said user has performed said assessment of said previous work plan.

6. The system of claim 5, wherein said assessment is aided by the display of a strategy assessment screen on said display means, where said strategy assessment screen includes indications of status of problems, whether or not said strategy was practical, whether or not said strategy works, and whether or not said strategy will continue; and where said user enters said strategy assessment data using said strategy assessment screen and said data entry means.

7. The system of claim 1, wherein said processor further provides a meeting report function, where meeting report information can be linked to any one of said problems.

8. The system of claim 1, wherein said processor further provides a report function for generating reports containing system data.

9. The system of claim 1, wherein said processor further provides a phone book function which retrieves from said memory and displays on said display means a plurality of contacts identified by name and beat area, where each of said contacts is associated with contact data entered by said user.

10. The system of claim 1, wherein said processor further provides a resource function, which retrieves from said memory and displays on said display means a social services resource screen that provides information on social services organizations.

11. The system of claim 1, wherein said processor further provides a beat overview function, which retrieves from said memory and displays on said display means a beat overview screen that indicates all problems in said beat area, a status of said problems, and a frequency of condition log entries for each problem.

12. The system of claim 1, wherein said processor further provides a key word search function having a key word search screen displayed on said display means, and where a key word is searched for in one or more search areas.

13. The system of claim 1, wherein said condition log function and said work plan function provide for entering by said data entry means of new problem definition data, where said functions display on said display means a plurality of questions to prompt said user to categorize a new problem.

* * * * *